United States Patent
Shekhar et al.

(10) Patent No.: US 11,907,643 B2
(45) Date of Patent: Feb. 20, 2024

(54) DYNAMIC PERSONA-BASED DOCUMENT NAVIGATION

(71) Applicant: ADOBE INC., San Jose, CA (US)

(72) Inventors: Sumit Shekhar, Bengaluru (IN); Tanvi V. Karandikar, Pune (IN); Nethraa Sivakumar, Chennai (IN); Shelly Jain, Bangalore (IN); Himanshu Maheshwari, Jodhpur (IN); Vinay Aggarwal, New Delhi (IN); Navita Goyal, College Park, MD (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 17/732,920

(22) Filed: Apr. 29, 2022

(65) Prior Publication Data

US 2023/0351096 A1    Nov. 2, 2023

(51) Int. Cl.
*G06F 40/137* (2020.01)
*G06F 40/295* (2020.01)
(Continued)

(52) U.S. Cl.
CPC .......... *G06F 40/137* (2020.01); *G06F 40/20* (2020.01); *G06F 40/295* (2020.01); *G06N 20/00* (2019.01); *G06V 30/413* (2022.01); *G06V 30/416* (2022.01)

(58) Field of Classification Search
CPC .... G06F 40/137; G06F 40/295; G06F 40/258; G06F 3/048; G06F 3/0482; G06F 16/93; G06F 16/954; G06F 16/955; G06F 16/9562; G06F 2216/07; G06F 40/177; G06F 40/279; G06F 40/30; G06F 16/3344;
(Continued)

(56) References Cited

U.S. PATENT DOCUMENTS 11,288,453 B1 * 3/2022 Vinicombe ............ G06F 40/284
11,526,848 B2 * 12/2022 Khokhar ................ G06Q 10/10
(Continued)

FOREIGN PATENT DOCUMENTS

CN    111382184 A  *  7/2020

OTHER PUBLICATIONS

Maheshwari et al. DynamicTOC: Persona-based Table of Contents for Consumption of Long Documents. Proceedings of the 2022 Conference of the North American Chapter of the Association for Computational Linguistics: Human Language Technologies, pp. 5133-5143 Jul. 10-15, 2022 © 2022 ACM (Year: 2022).*

(Continued)

*Primary Examiner* — Nicholas Ulrich
(74) *Attorney, Agent, or Firm* — Shook, Hardy & Bacon L.L.P.

(57) ABSTRACT

Embodiments of the technology described herein are directed to a persona-specific navigation interface for a document. Initially, a user may select a persona associated with a document through a document navigation interface. A machine-learning model may identify an interest within a portion of the document. The interest may be mapped to the persona. A navigation interface that includes a navigable link to the portion of the document is generated and output for display. A user interaction with the navigable link is received. In response to the interaction, the portion of the document corresponding to the navigable link is output for display.

20 Claims, 10 Drawing Sheets

(51) Int. Cl.
*G06V 30/416* (2022.01)
*G06V 30/413* (2022.01)
*G06F 40/20* (2020.01)
*G06N 20/00* (2019.01)

(58) Field of Classification Search
CPC ........ G06F 40/205; G06F 40/40; G06F 40/20; G06F 16/3329; G06F 40/00; G06V 30/416; G06V 30/413; G06V 30/41; G06N 20/00
See application file for complete search history.

(56) References Cited

U.S. PATENT DOCUMENTS

| | | | | |
|---|---|---|---|---|
| 2004/0006742 | A1* | 1/2004 | Slocombe | G06F 40/157 715/201 |
| 2011/0093293 | A1* | 4/2011 | G. N. | G16Z 99/00 707/E17.014 |
| 2016/0034757 | A1* | 2/2016 | Chhichhia | G06F 16/35 382/206 |
| 2017/0277668 | A1* | 9/2017 | Luo | G06F 16/345 |
| 2019/0114479 | A1* | 4/2019 | Gelosi | G06F 40/166 |
| 2019/0121840 | A1* | 4/2019 | Abbott | G06F 40/106 |
| 2019/0155884 | A1* | 5/2019 | Liu | G06F 40/205 |
| 2020/0159795 | A1* | 5/2020 | Weldemariam | G06F 16/9535 |
| 2020/0311542 | A1* | 10/2020 | Wang | G06F 18/2413 |
| 2020/0364408 | A1* | 11/2020 | Lao | G06N 3/044 |
| 2021/0081613 | A1* | 3/2021 | Begun | G06N 20/00 |
| 2021/0209139 | A1* | 7/2021 | Wu | G06F 40/35 |
| 2021/0374398 | A1* | 12/2021 | Li | G06V 10/40 |
| 2022/0100676 | A1* | 3/2022 | Yan | G06F 12/0895 |
| 2023/0132061 | A1* | 4/2023 | Pfitzmann | G06V 30/416 706/45 |

OTHER PUBLICATIONS

Pruitt et al. Personas: Practice and Theory. © 2003 ACM 1-58113-728-1 03/0006. 15 pages. (Year: 2003).*
Lewis et al. (2019) Fad or future? Automated analysis of financial text and its implications for corporate reporting. Accounting and Business Research, 49:5, 587-615, DOI: 10.1080/00014788.2019.1611730. 29 pages + cover (Year: 2019).*
Blei, D. M., et al., "Latent Dirichlet Allocation", Journal of Machine Learning Research, vol. 3, pp. 993-1022 (2003).
Gollapalli, S. D., and Caragea, C., "Extracting Keyphrases from Research Papers Using Citation Networks", Proceedings of the Twenty-Eighth AAAI Conference on Artificial Intelligence, Association for the Advancement of Artificial Intelligence, pp. 1629-1635 (2014).
Rush, A. M., et al., "A Neural Attention Model for Abstractive Sentence Summarization", Proceedings of the Conference on Empirical Methods in Natural Language Processing, Association for Computational Linguistics, pp. 379-389 (Sep. 17-21, 2015).
Liu, Q., et al., "Improving Opinion Aspect Extraction Using Semantic Similarity and Aspect Associations", Proceedings of the Thirtieth AAAI Conference on Artificial Intelligence (AAAI), Association for the Advancement of Artificial Intelligence, pp. 2986-2992 (2016).
Yang, B., and Cardie, C., "Extracting Opinion Expressions with semi-Markov Conditional Random Fields", Proceedings of the Joint Conference on Empirical Methods in Natural Language Processing and Computational Natural Language Learning, Association for Computational Linguistics, pp. 1335-1345 (Jul. 12-14, 2012).
Alvarez-López, T., et al., "GTI at SemEval-2016 Task 5: SVM and CRF for Aspect Detection and Unsupervised Aspect-Based Sentiment Analysis", Proceedings of the 10th International Workshop on Semantic Evaluation (SemEval), Association for Computational Linguistics, pp. 306-311 (Jun. 16-17, 2016).
Shi, T., et al., "A Simple and Effective Self-Supervised Contrastive Learning Framework for Aspect Detection", Proceedings of the Thirty-Fifth AAAI Conference on Artificial Intelligence, Association for the Advancement of Artificial Intelligence, vol. 35, No. 15, pp. 13815-13824 (2021).
Saeidi, M., et al., "Interpretation of natural language rules in conversational machine reading", Proceedings of the Conference on Empirical Methods in Natural Language Processing, Association for Computational Linguistics, pp. 2087-2097 (Oct. 31-Nov. 4, 2018).
Liu, Y., et al., "On Learning Text Style Transfer with Direct Rewards", Proceedings of the 2021 Conference of the North American Chapter of the Association for Computational Linguistics: Human Language Technologies, pp. 4262-4273 (Jun. 6-11, 2021).
Kumar, V., et al., "Putting the Horse Before the Cart: A Generator-Evaluator Framework for Question Generation from Text", Proceedings of the 23rd Conference on Computational Natural Language Learning (CoNLL), Association for Computational Linguistics, pp. 812-821 (Nov. 3-4, 2019).
Hulth, A., "Improved Automatic Keyword Extraction Given More Linguistic Knowledge", Proceedings of the Conference on Empirical Methods in Natural Language Processing, pp. 216-223 (2003).
Bougouin, A., et al., "TopicRank: Graph-Based Topic Ranking for Keyphrase Extraction", International Joint Conference on Natural Language Processing (IJCNLP), pp. 543-551 (Oct. 14-18, 2013).
See, A., et al., "Get To The Point: Summarization with Pointer-Generator Networks", arXiv:1704.04368v2, pp. 1-20 (Apr. 25, 2017).
Jin, W., et al., "OpinionMiner: A Novel Machine Learning System for Web Opinion Mining and Extraction", Proceedings of the 15th ACM SIGKDD International Conference on Knowledge Discovery and Data Mining, pp. 1-9 (Jun. 28-Jul. 1, 2009).
Wang, W., et al., "Recursive Neural Conditional Random Fields for Aspect-based Sentiment Analysis", Proceedings of the Conference on Empirical Methods in Natural Language Processing, Association for Computational Linguistics, pp. 616-626 (Nov. 1-5, 2016).
Srivastava, A., and Sutton, C., "Autoencoding Variational Inference for Topic Models", 5th International Conference on Learning Representations (ICLR), pp. 1-12 (2017).
Stede, M., and Schlangen, D., "Information-Seeking Chat: Dialogue Management by Topic Structure", In Proceedings of Catalog the 8th workshop on the semantics and pragmatics of dialogue (SemDial), pp. 1-8 (2004).
Du, X., et al., "Learning to Ask: Neural Question Generation for Reading Comprehension", Proceedings of the 55th Annual Meeting of the Association for Computational Linguistics, Association for Computational Linguistics, pp. 1342-1352 (Jul. 30-Aug. 4, 2017).
Goyal, N., et al., "Multi-Style Transfer with Discriminative Feedback on Disjoint Corpus", Proceedings of the Conference of the North American Chapter of the Association for Computational Linguistics: Human Language Technologies, pp. 3500-3510 (Jun. 6-11, 2021).
Zhang, S., and Bansal, M., "Addressing Semantic Drift in Question Generation for Semi-Supervised Question Answering", Proceedings of the Conference on Empirical Methods in Natural Language Processing and the 9th International Joint Conference on Natural Language Processing, Association for Computational Linguistics, pp. 2495-2509 (Nov. 3-7, 2019).
Sang, E. F. T. K., and Meulder, F. D., "Introduction to the CoNLL-2003 Shared Task: Language-Independent Named Entity Recognition", Proceedings of the Seventh Conference on Natural Language Learning at HLT-NAACL, vol. 4, pp. 142-147 (May 2003).
Hirao, T., et al. "Ntt's multiple document summarization system for DUC2003", Proc. DUC., pp. 1-5 (2003).
Devlin, J., et al., "BERT: Pre-training of Deep Bidirectional Transformers for Language Understanding", In Proceedings of the Conference of the North American Chapter of the Association for Computational Linguistics: Human Language Technologies (NAACL-HLT), vol. 1, pp. 4171-4186 (Jun. 2-7, 2019).
Parikh, A. P., et al., "ToTTo: A Controlled Table-To-Text Generation Dataset", Proceedings of the Conference on Empirical Methods in Natural Language Processing (EMNLP), Association for Computational Linguistics, pp. 1173-1186 (Nov. 16-20, 2020).
Tixier, A. J.-P., et al., "A Graph Degeneracy-based Approach to Keyword Extraction", Proceedings of the Conference on Empirical

(56) References Cited

OTHER PUBLICATIONS

Methods in Natural Language Processing, Association for Computational Linguistics, pp. 1860-1870 (Nov. 1-5, 2016).
Wu, Y-F. B., et al., "Domain-specific Keyphrase Extraction", Proceedings of the 14th ACM International Conference on Information and Knowledge Management (CIKM), pp. 283-284 (Oct. 31-Nov. 5, 2005).
Lopyrev, K., "Generating News Headlines with Recurrent Neural Networks", arXiv:1512.01712v1, pp. 1-9 (Dec. 5, 2015).
Qiu, G., et al., "Opinion Word Expansion and Target Extraction through Double Propagation", Association for Computational Linguistics, vol. 37, No. 1, pp. 9-27 (2011).
Mitchell, M., et al., "Open Domain Targeted Sentiment", Proceedings of the Conference on Empirical Methods in Natural Language Processing, Association for Computational Linguistics, pp. 1643-1654 (Oct. 18-21, 2013).
Shi, T., et al., "Short-Text Topic Modeling via Non-negative Matrix Factorization Enriched with Local Word-Context Correlations", Proceedings of the World Wide Web Conference, Track: Web Content Analysis, Semantics and Knowledge, pp. 1105-1114 (Apr. 23-27, 2018).
He, R., et al., "An Unsupervised Neural Attention Model for Aspect Extraction", Proceedings of the 55th Annual Meeting of the Association for Computational Linguistics, Association for Computational Linguistics, vol. 1 (Long Papers), pp. 388-397 (Jul. 30-Aug. 4, 2017).
Shuklar, P., et al., "What Should I Ask? Using Conversationally Informative Rewards for Goal-Oriented Visual Dialogue", Proceedings of the 57th Annual Meeting of the Association for Computational Linguistics, Association for Computational Linguistics, pp. 6442-6451 (Jul. 28-Aug. 2, 2019).
Pasunuru, R., and Bansal, M., "Multi-Reward Reinforced Summarization with Saliency and Entailment", In Proceedings of the Conference of the North American Chapter of the Association for Computational Linguistics: Human Language Technologies (NAACL-HLT), vol. 2 (Short Papers), pp. 646-653 (Jun. 1-6, 2018).
Xie, Y., et al., "Exploring Question-Specific Rewards for Generating Deep Questions", Proceedings of the 28th International Conference on Computational Linguistics, pp. 2534-2546 (Dec. 8-13, 2020).
Zhang, J., "Pegasus: Pre-training with Extracted Gap-sentences for Abstractive Summarization", Proceedings of the 37th International Conference on Machine Learning, Online (PMLR 119), pp. 1-12 (2020).
Fan, A., et al., "ELI5: Long Form Question Answering", Proceedings of the 57th Annual Meeting of the Association for Computational Linguistics, pp. 3558-3567 (Jul. 28-Aug. 2, 2019).
Liu, F., et al., "Unsupervised Approaches for Automatic Keyword Extraction Using Meeting Transcripts", Proceedings of Human Language Technologies: The Annual Conference of the North American Chapter of the Association for Computational Linguistics (ACL), pp. 620-628 (Jun. 2009).
Shang, J., et al., "Automated Phrase Mining from Massive Text Corpora", IEEE Transactions on Knowledge and Data Engineering, pp. 1-14 (2018).
Dorr, B., et al., "Hedge Trimmer: A Parse-and-Trim Approach to Headline Generation", Proceedings of the HLT-NAACL 03 on Text Summarization Workshop, vol. 5, pp. 1-8 (2003).
Zhang, R., et al., "Outline Generation: Understanding the Inherent Content Structure of Documents", Proceedings of the 42nd International ACM SIGIR Conference on Research and Development in Information Retrieval, Association for Computing Machinery, arXiv:1905.10039v1, pp. 1-10 (May 24, 2019).
Li, F., et al., "Structure-Aware Review Mining and Summarization", Proceedings of the 23rd International Conference on Computational Linguistics (Coling), pp. 653-661 (Aug. 2010).
Liu, P., et al., "Fine-grained Opinion Mining with Recurrent Neural Networks and Word Embeddings", Proceedings of the Conference on Empirical Methods in Natural Language Processing, Association for Computational Linguistics, pp. 1433-1443 (Sep. 17-21, 2015).
Luo, L., et al., "Unsupervised Neural Aspect Extraction with Sememes", Proceedings of the Twenty-Eighth International Joint Conference on Artificial Intelligence (IJCAI), pp. 5123-5129 (2019).
Heilman, M., and Smith, N. A., "Good Question! Statistical Ranking for Question Generation", Human Language Technologies: The Annual Conference of the North American Chapter of the ACL, Association for Computational Linguistics, pp. 609-617, (Jun. 2010).
Krishna, K., and Iyyer, M., "Generating Question-Answer Hierarchies", Proceedings of the 57th Annual Meeting of the Association for Computational Linguistics, pp. 2321-2334 (Jul. 28-Aug. 2, 2019).
Hosking, T., and Riedel, S., "Evaluating Rewards for Question Generation Models", In Proceedings of the Conference of the North American Chapter of the Association for Computational Linguistics: Human Language Technologies (NAACL-HLT), pp. 2278-2283 (Jun. 2-7, 2019).
Lewis, M., et al., "BART: Denoising Sequence-to-Sequence Pre-training for Natural Language Generation, Translation, and Comprehension", arXiv:1910.13461v1, pp. 1-10 (Oct. 29, 2019).
Campos, R., et al., "YAKE! Collection-Independent Automatic Keyword Extractor", European Conference on Information Retrieval (ECIR), pp. 806-810 (2018).
Lai, H., et al., "Thank you BART! Rewarding Pre-Trained Models Improves Formality Style Transfer", Proceedings of the 59th Annual Meeting of the Association for Computational Linguistics and the 11th International Joint Conference on Natural Language Processing (Short Papers) (ACL-IJCNLP), pp. 484-494 (Aug. 1-6, 2021).
"A Model for Open Domain Long Form Question Answering", accessed at https://yjernite.github.io/lfqa.html, accessed on Oct. 28, 2022, 31 pages.
"ToTTo Dataset", accessed at https://github.com/google-research-datasets/ToTTo, accessed on Oct. 28, 2022, 7 pages.

* cited by examiner

DYNAMIC PERSONA-BASED DOCUMENT NAVIGATION

BACKGROUND

A table of contents may help a reader find portions of a document that are of interest to the reader. The table of contents usually includes the titles or descriptions of first-level headings (chapters in longer works), and often includes second-level headings (sections or A-heads) within the chapters as well, and may include third-level headings (subsections or B-heads) within the sections as well. The depth of detail in tables of contents can be customized by the author. A table of contents traditionally appears at the beginning of a document, but computer applications may present the table of contents in a side panel adjacent to a main body of the document.

Printed tables of contents indicate page numbers where each part starts, while digital ones offer links to navigate the document view to a corresponding part. The format and location of the page numbers is a matter of style. Many popular word processors are capable of automatically generating a table of contents if the author of the text uses specific styles for chapters, sections, subsections, etc. Presently, all readers see the same table of contents and generation of the table of contents is based on headings provided by the document generator (e.g., author, editor, or publisher).

SUMMARY

Embodiments of the technology described herein are directed to a persona-specific navigation interface for a document. In one aspect, a persona-specific table of contents is generated. Many documents, such as financial statements, academic reports, and legal contracts are often long, and replete with domain-specific description and information. These documents are read and consumed by groups of readers with different interests. These reader groups may be interested in different parts of the document. For example, a lawyer may be interested in legal risks, while an accountant is interested in tax liability. To enhance the consumption experience of each persona, the persona-specific navigation interface learns topics of interest to a particular persona and generates a persona-specific navigation interface that highlights portions of a document describing the topics of interest.

The persona-specific navigation interface contrasts with the traditional table of content populated with section and chapter headings that are the same for every reader. The traditional table of content is not customized to serve different personas. The technology described herein is directed to a dynamic persona-specific navigation experience for efficient consumption of the document, which can be personalized for various domains of readers. The persona-specific navigation interface identifies interests within a document, allows the user to select a persona, and then presents a navigation interface that highlights portions of a document that are of interest to the selected persona. Portions of the document that are not likely to be of interest are deemphasized or omitted from the persona-specific navigation interface.

The persona-specific navigation interface may include automatically generated questions that help identify interests. The traditional table of content does not exploit the information present outside of the headings, such as in the underlying paragraphs. The persona-specific navigation interface may include a question-based guided experience to enhance the visibility of the information present in the underlying paragraphs and multimodal entities like tables. The automatically generated questions in the interface can be linked to document portions and tables that answer the question. Upon selection of the question from the navigation interface, the document may be navigated to a portion that answers the question.

DETAILED DESCRIPTION

Figure 1:
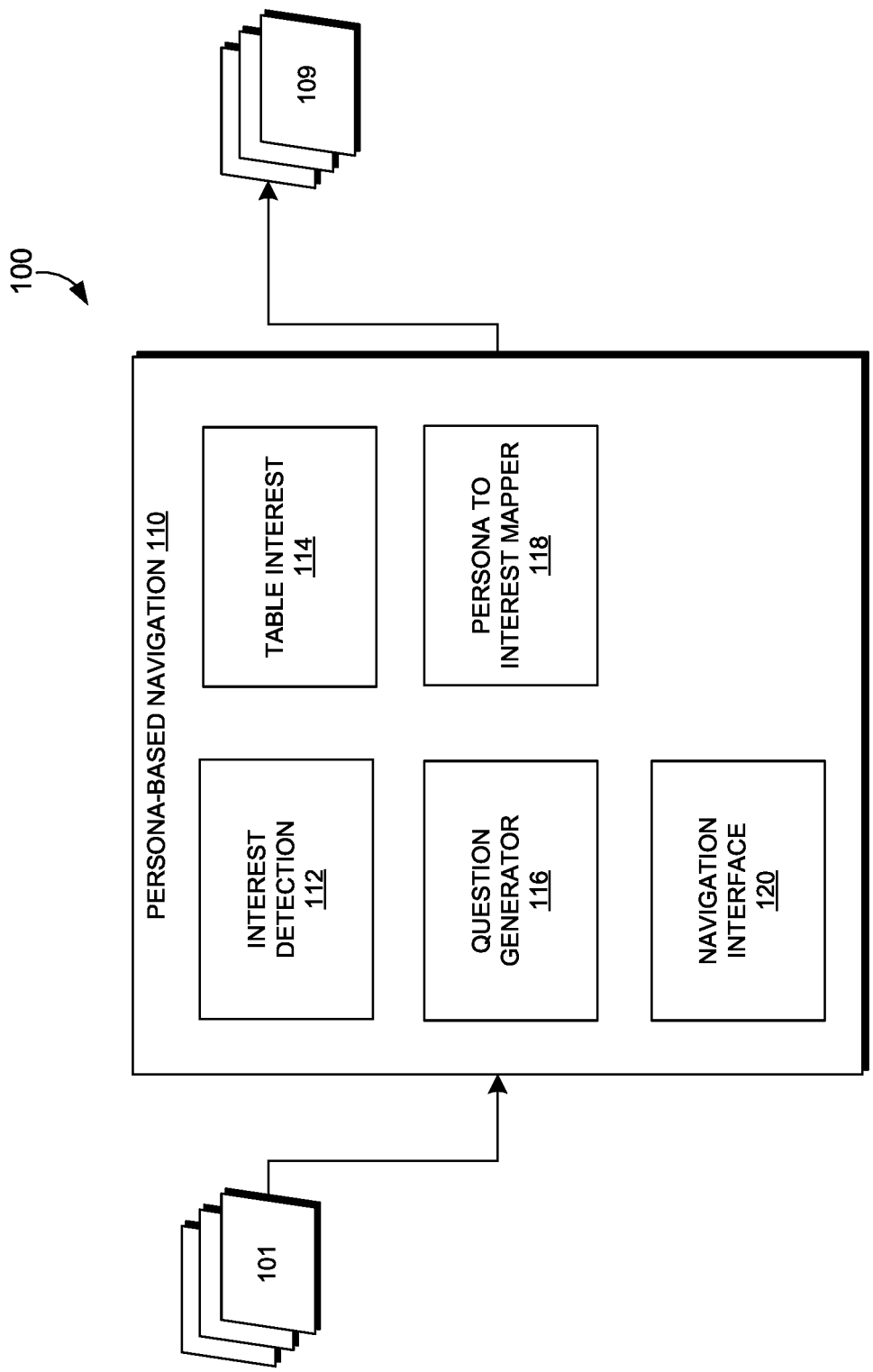
FIG. 1 is an illustration of a persona-based navigation interface environment, in accordance with embodiments of the technology described herein.

The technology described herein generates a persona-specific navigation interface that helps a user navigate a document according to a reader's interests. Portions of documents, especially long documents, are of varying levels of interest to different categories of readers. For example, a CEO ("Chief Executive Officer") may be interested in different portions of a corporate filing with the SEC ("Security Exchange Commission") than a CFO ("Chief Financial Officer"). The technology described herein identifies the reader's interests and then matches those interests to portions of a document. A persona-specific navigation interface allows the user to navigate to document parts by selecting a description of the corresponding part from the navigation interface. The navigation interface may present portions of the document in a non-linear arrangement with portions of highest interest presented first. (In contrast to a non-linear arrangement, a linear arrangement presents portions of the document in order of occurrence within the document.)

The persona-specific navigation interface allows the user to select a persona. The persona, as used herein, is a collection one or more interests associated with a category of reader (e.g., CEO, CFO, Investor, employee, customers). A customized navigation interface is generated based on the selected persona. The portions of content described in the persona-specific navigation interface have identified interests that map to the one or more interests associated with the selected persona. Different types of documents may be associated with a different group of personas. The personas and associated interests may be generated by subject matter experts in a type of document. Different types of documents may be have different interests and be associated with different personas. The models described herein may be trained to process specific types of documents. One trained model could be used to generate a persona-specific navigation interface for a first type of document (e.g., SEC filing), while a second trained model could be used to generate a persona-specific navigation interface for a second type of document (e.g., academic paper).

Identifying interests within a document can be a resource intensive task. The technology described herein trains a model to identify interests within document portions, such as paragraphs. The model is trained using an unsupervised method that is more efficient than existing methods of identifying interests. The unsupervised method produces a high level of accuracy, while also saving resources.

The technology described herein generates questions that are answered by a document portion. These questions can form part of the navigation interface. The questions can be used instead of document headings or in addition to document headings. The goal is to generate questions the user may have and then link to a portion of the document containing the answer. For example, a paragraph describing a company's executive compensation could be linked to a question asking, "How much did the CEO earn in 2022?" The questions provide an alternative to the traditional table of content that includes only the headings & subheadings of different sections.

Non-collocated tables and/or non-referenced tables present special challenges. These types of tables may be completely omitted from a traditional navigation interface, except, possibly as an appendix of tables or some other generic description. The relevance of tables that are not directly referenced (i.e., non-referenced) with a document portion and/or are not located near the relevant document portion (i.e., non-collocated) is difficult to determine. One source of the difficulty is the lack of natural language within a table. The table may include column headings and row descriptions, but existing natural language processing may not be able to determine the subject matter of the table with a high level of confidence. The technology described herein uses an unsupervised machine learning technology to map tables to paragraphs based on a similarity score. The interest identified in a mapped paragraph may then be associated with the table. Tables that would otherwise be omitted from a traditional navigation interface may then be included in the persona-specific navigation interface based on the interest mapped to the table.

The technology described herein presents a navigation interface that highlights document portions likely to be of interest to a specific user. Existing methods of determining interests within a document use natural language models that are resource intensive to train through a supervised learning process. The existing models require carefully curated and labeled training data. In contrast, the unsupervised learning of the interest detection process does not require any labelled training data and is, therefore, more efficient to train. Instead of using training data, the interest detection process creates self-defined pseudo labels as supervision and learns text representations, which are then used in downstream tasks to identify interests within document portions.

The technology described herein is also able to identify interests in document portions with too little natural language data for existing methods to identify an interest. One example of such a document portion is a table. The technology described herein associates a table with a portion of the document in which an interest is detectable and then applies the interest to the table. The table can be associated with the document portion even though the table is not directly referenced in the document portion or co-located with the document portion. Instead, the association is made through identifying common terms (e.g., row or column headings) in the table and document portion.

Persona-Specific Navigation Interface Environment

Turning now to FIG. 1, a persona-specific navigation environment 100 is shown, in accordance with implementations of the present disclosure. The environment 100 includes a persona-specific navigation component 110 that receives a document 101 as input and generates a persona-specific navigation interface 109 as output. A navigation interface 109 may be generated for each document. Exemplary persona-specific navigation interfaces are shown in FIGS. 2-5. In aspects, operations may be split between client-side devices and server-side devices. Further, the components shown may interact with computing devices not shown in FIG. 1, such as user devices. For example, various user interfaces generated by, or with information generated by the components shown, may be displayed on a user device, such as a laptop.

The arrangements described herein are set forth only as examples. Other arrangements and elements (e.g., machines, interfaces, functions, orders, and groupings of functions, etc.) may be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions are carried out by a processor executing instructions stored in memory.

Moreover, these components, functions performed by these components, or services carried out by these components are implemented at appropriate abstraction layer(s), such as the operating system layer, application layer, hardware layer, etc., of the computing system(s). Alternatively, or in addition, the functionality of these components and/or the embodiments of the technology described herein are performed, at least in part, by one or more hardware logic components. For example, and without limitation, illustrative types of hardware logic components include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. Additionally, although functionality is described herein regarding specific components shown in example environment 100, it is contemplated that in some embodiments functionality of these components are shared or distributed across other components.

Through not shown, a user device is any type of computing device capable of use by a user. For example, in one embodiment, a user device is of the type of computing device described in relation to FIG. 10 herein. In various embodiments, a user device is a personal computer (PC), a laptop computer, a mobile or mobile device, a smartphone, a tablet computer, a smart watch, a wearable computer, a virtual reality headset, augmented reality glasses, a personal digital assistant (PDA), an MP3 player, a global positioning system (GPS) or device, a video player, a handheld communications device, a gaming device or system, an entertainment system, a vehicle computer system, an embedded system controller, a remote control, an appliance, a consumer electronic device, a workstation, or any combination of these delineated devices, or any other suitable device.

As mentioned, the persona-based navigation component 110 receives a document 101 as input and generates a persona-specific navigation interface 109. The persona-based navigation component 110 includes an interest detection component 112, a table interest component 114, a question generator 116, a persona-to-interest mapper 118, and a navigation interface component 120. These components work together to detect to generate a persona-based navigation interface.

The interest detection component 112 identifies interests within the document. The interest detection component 112 receives a document 101 as input. As a preliminary step, the document 101 may be segmented into portions for analysis. In one aspect, the portions are paragraphs. The text of each portion may be analyzed as a separate data point for interests expressed in the text. In one aspect, extra information outside of the paragraphs, such as headings, sub-headings, blank lines, signature fields, and the like are not analysed during the interest detection. The interest may be detected through natural language processing of the text. In aspects, portions (e.g., paragraphs) with less than a threshold amount of words, such as 10 words, are not analysed.

In one aspect, the interest detection component 112 receives pre-processed text, rather than the raw text. The text portion may be pre-processed into multiple different formats and the interest detection component 112 may receive the text in multiple formats as input. In one aspect, the text is pre-processed into each of several formats. The text in several formats is then stored in a single JSON dictionary. In aspects, the JSON dictionary may be provided to the interest detection component 112 as input. In one aspect, the pre-processed formats include a tokenized version, a stemmed version, and a core words version. Types of applicable tokenization may include character (e.g., n-gram) tokenization, word tokenization, byte pair encoding (BPE), and sub-word tokenization. The word tokenization splits a piece of text into individual words based on a certain delimiter (e.g., space). Depending upon delimiters, different word-level tokens are formed. The stemmed version may be generated using a heuristic that reduces words in a text to their base. Stemming may involve removing the prefix or suffix of words so that only the base of the word remains. The core words version may include only the content words (e.g., meaningful words, like nouns, verbs, adjectives and adverbs) of the paragraph. The core words may be generated by identifying keywords, noun phrases, entities, and/or by excluding stop words.

The interest detection component 112 may use unsupervised interest detection to automatically extracting interpretable interests from the textual documents. The interest detection component 112 may use a self-supervised contrastive learning model for interest detection. Self-supervised learning is a subset of unsupervised learning. Unlike supervised learning, it does not require any labelled training data. Instead, it creates self-defined pseudo labels as supervision and learns text representations, which are then used in downstream tasks. Contrastive learning aims to group similar samples closer and diverse samples far from each other.

The process of training self-supervised contrastive learning model may start by obtaining a vocabulary for the whole corpus of words in a document. The vocabulary may be sorted alphabetically and each word is given an index, so that corresponding IDF ("Inverse Dense Frequency")/word vectors can be referenced. In an aspect, 128-dimensional word vectors are generated on the corpus by a skip-gram model with an n-gram size of 5. These are used to obtain a general embedding space for the words. The word vectors generated previously are clustered together based on similarity to obtain the desired number of clusters. In an aspect, K-means clustering is used to obtain 20 clusters comprising 10 keywords each. Each word representation is modified by multiplying it with the TF-IDF (Term Frequency(TF)—Inverse Dense Frequency(IDF) score so that the algorithm can adapt to the financial corpus better. The cluster of 10 keywords forms an interest. Thus, 20 interests may be detected in this example. The interests can be mapped back to paragraphs by calculating a similarity between the keywords in the cluster and keywords in the paragraph.

The table interest identifier 114 associates an interest identified in the document text with a table. Financial Statements are an example of a multi-modal document that contains many tables along with the textual content. The tables may not have captions and may not be mention in the paragraphs. The table interest identifier 114 uses an algorithm to extract keywords and entities from the tables and maps the tables to paragraphs with similar keywords and entities. The interest(s) identified in the paragraph may then be assigned to the table. The table can then be linked to a persona via the interest.

As an example, 10-K filings (a filing corporations make to the SEC) may contain many tables that lack direct mapping from the table to the passage. For some personas, tables may include data that is of particular relevance to an interest. The persona-specific navigation interface is able to highlight these tables when the tables interest is known. Thus, it is important to determine what interests a table is associated with.

As an initial step, tables within the document identified are extracted from the document. Each extracted table may be saved in a list. In an aspect, the list contains the HTML code for each extracted table. NaN (Not a Number) values are removed from the table and if a column only had NaN values, the column is excluded from further analysis. Similarly, all empty rows are excluded from analysis. The processed table is stored along with an index value to identify the mapping. If the table has an associated caption, it may be stored separately.

Tables that contain the same or similar entities as a paragraph may be associated with the paragraph. Applying this logic to map tables to paragraphs, the table interest identifier 114 leverages Named Entity Recognition (NER) and Key Phrase Extraction (KPE) to identify entities within a table. Named Entity Recognition may be used to identify a real-world noun entity from the text data in the table or table caption. The extracted entity may be classified into predefined categories like person, place, time, organization, etc. In one aspect, the table interest identifier 114 uses a BERT model that is fine-tuned on the CONLL 2003 dataset to detect four types of named entities—persons, locations, organizations, and names of miscellaneous entities. Aspects are not limited to use with the BERT model or these four entity categories.

Key Phrase Extraction (KPE) may be used to extract important phrases from the text that NER might have missed. In one aspect, a lightweight unsupervised automatic keyword extraction method may be used. This method rests on text statistical features extracted from single documents to select the most important keywords of a text. This type of KPE model does not need to be trained on a set of documents and may not depend on external corpus, dictionary, size of text or domain.

Once entities and key phrases are extracted, they may be used to link tables to paragraphs. Initially, the contents of each paragraph and table may be stored separately. NER and KPE are applied to each table and passage individually. In one aspect, a limit on the amount of key phrases and or entities extracted may be used. For example, the number of key phrases extracted for paragraphs may be limited to 20 and limited to 10 for tables (as tables generally have less text). Next, repeated named entities within a table or paragraph are removed. Then, the entities and the key phrases extracted for an element (e.g., paragraph or table) are added together to form a single string. Thus, a separate string may be created for each table and each paragraph.

A similarity metric is used to compare the strings (containing both NER and KPE) obtained for each paragraph string to each table string. While there are many similarity metrics available, in an aspect, Jaccard similarity may be used to generate the similarity score. Once the Jaccard similarity scores are obtained for each paragraph-table pair, given a paragraph, the table interest identifier 114 may find that table which has the maximum similarity score and match the table and paragraph together (linking a relevant table, given a paragraph). In aspects, multiple tables can be linked to a single paragraph. In an aspect, all tables with a similarity score above a certain threshold are linked to the corresponding paragraph. In this way, it may be possible for multiple tables to be linked to a single paragraph and a table to be linked to multiple paragraphs.

A table may then be associated with one or more interests identified in a linked paragraph. These interests may be associated the table in a data store. In other aspects, the link is just between the table and paragraph and interests are not expressly associated with a table. When a paragraph is deemed relevant to an interest, then one or more tables linked to the paragraph may be displayed in the document view when the paragraph is displayed.

The question generator 116 supplements the headings in persona-specific navigation interface with relevant questions generated from the paragraphs of the document 101. Studies have shown that questions are more intuitive and informative than headings and hence can provide a better understanding the paragraph content. Questions can provide a meaningful understanding of the document at a paragraph or section level, which may not be captured by a heading (or sub-heading). Therefore, to aid in document consumption, question generator 116 generates long-form questions (i.e., questions based on paragraphs instead of entities) to enhance the navigation experience.

The question generator 116 may use an encoder-decoder architecture for the task of generating questions given the paragraph as context, which essentially is a sequence-to-sequence task. In one aspect, the question generator 116 uses BART as the underlying language model. The task is to generate questions covering the entire paragraph and summarize the paragraph by capturing the most-salient information in form of a question.

In one aspect, the ELI5 dataset is used to train question generator 116. ELI5 (or Explain Like I'm 5), is a question-answer dataset scraped from the subreddit r/explainlikeimfive/. The subreddit rules encourage people to ask a question about any topic and get an answer for it. To maintain the dataset's quality, only those question-answer pairs with more than two upvotes may be included in the training data. During training with the ELI5 dataset, the answer is provided as the input to the encoder-decoder model, which is trained to generate the corresponding question and minimize the cross-entropy loss with respect to the ground truth (the corresponding question from the ELI5 dataset).

The ELI5 dataset is a general topic dataset. The trained model effectively generates questions for documents having topics represented in the training set. However, performance of the question generator 116 in certain specific domains may be enhanced using the reward training illustrated in FIG. 2.

Figure 2:
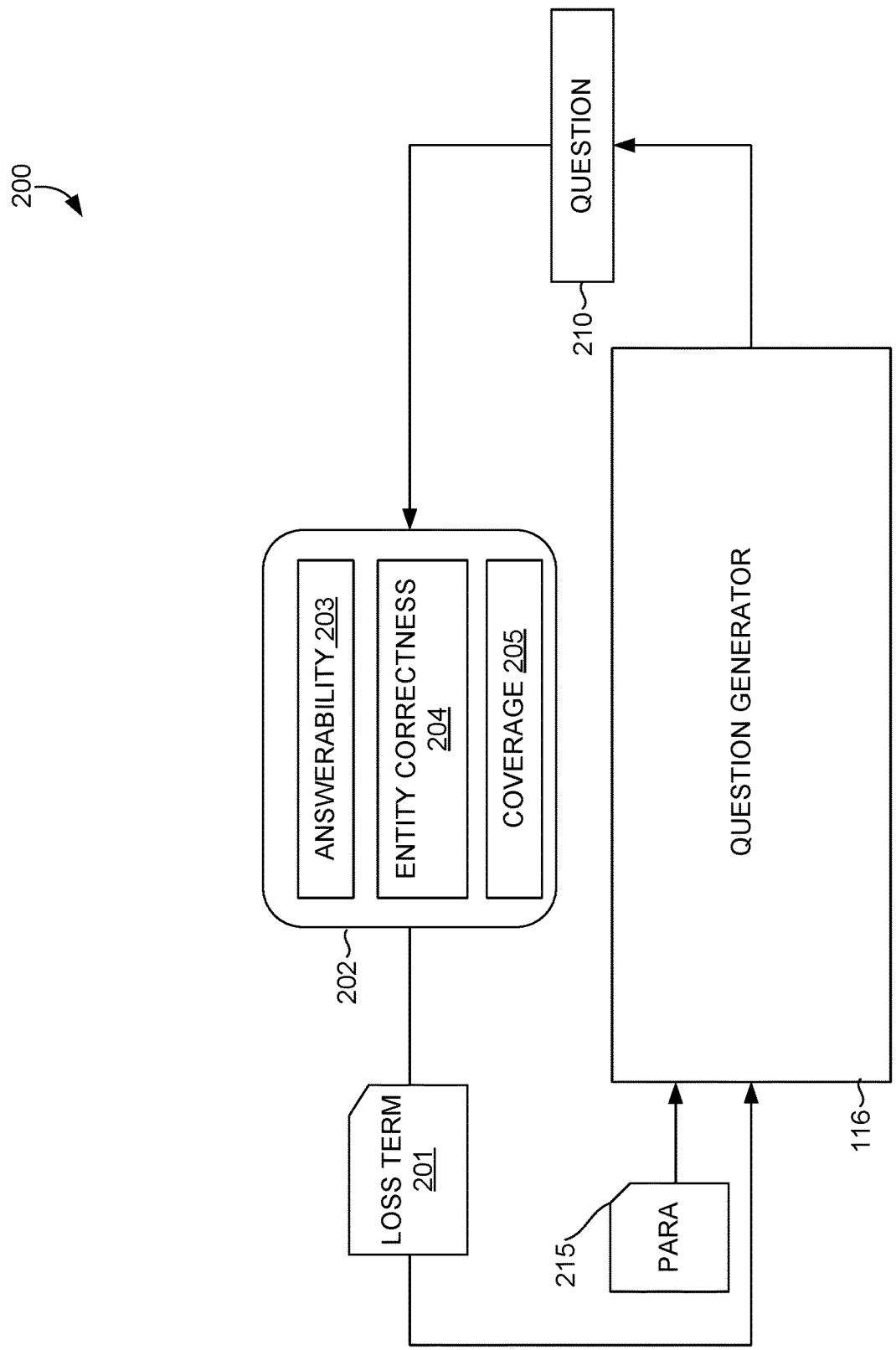
FIG. 2 provides a block diagram of question generation model, in which embodiments described herein may be employed.

FIG. 2 shows a reward-based training pipeline 200 used to train the question generator 116 by targeting the qualities sought in the final generated domain-specific questions. The training pipeline uses an answerability reward, an entity correctness rewards, and a coverage reward.

Answerability Classifier Reward: An automatically generated question 210 that is not answerable by the paragraph 215 from which it was generated does not help the reader understand the paragraph. To address this, an answerability classifier 203 is trained to judge the answerability of the question given the paragraph 215. At a high level, the paragraph and the generated question are provided as input to the answerability classifier 203 and the classifier predicts "1" if the question is answerable by the paragraph, otherwise "0". The classifier may be a fine tuned Roberta model trained with both positive and negative samples to fine tune Roberta. The positive samples may be a question paired with a good answer to the question. The negative samples may be a question paired with a bad answer to the question.

In one aspect, an automated method is used to generate the positive and negative samples. The positive examples may be randomly selected question and answers from the ELI5 dataset. To create negative samples for a question Q', its corresponding answer paragraph, A' may be compared to a random set of 100 question-answer pairs. A similarity of the answer paragraph (A') with all the 100 answers is generated. Top 3 most similar answers are taken as the negative samples for the question Q'. These represent effective negative samples because they are similar, but are not likely to effectively answer the question Q'.

Additional negative samples may be generated from Wikipedia articles, which are chosen based on their similarity with ELI5 data. For a question designated for a negative example, a similarity score is calculated with paragraphs in the Wikipedia articles. Negative examples can be generated by selecting Wikipedia paragraphs with a high similarity. The answerability reward ($R_{ans}$) may be described by the following equation:

$$R_{ans} = \text{Prob}_{classifier}(1 | P, Q)$$

Entity Correctness Reward: The encoder-decoder model generate questions with hallucinated entities and names like Microsoft, Apple etc. even when there was no mention of them in the corresponding paragraph. To reduce this possibility, the entity correctness scorer 204 identifies the named entities present in the generated question 210. If those entities appear in the corresponding paragraph 215 used to generate the question, then a reward of 1 is given else 0. If there is no entity in the generated question, a reward of 0.5 is given to the model. The entity reward may be expressed as:

$$R_{entity} = \begin{cases} 1, & \text{if } ent(Q) \neq \emptyset \text{ and } ent(Q) \subseteq ent(P) \\ 0, & \text{if } ent(Q) \neq \emptyset \text{ and } ent(Q) \nsubseteq ent(P) \\ 0.5, & \text{if } ent(Q) = \emptyset \end{cases}$$

where, ent(Q)=entities in question Q and ent(P)=entities in paragraph P.

Coverage Reward: In some cases, the output question may not cover the entire information present in the paragraph and instead focussed on small segments of it. The coverage reward encourages complete coverage of information in the paragraph 215. The idea is like the entity correctness reward. The coverage reward model 205 identifies keywords from the paragraph 215 using YAKE (Yet Another Keyword Extractor) or some other suitable keyword extraction algorithm. The coverage reward model 205 then calculates the similarity of keyword in the generated question 210 with these keywords. The coverage reward model 205 may use the Extended String Subsequence Kernel (ESSK) to calculate the similarity score. Conceptually, YAKE should generate keywords from different parts of the paragraph. When the similarity of this keyword list is compared with the generated question, the coverage reward encourages the model to include keywords from the entire paragraph. Thus, given a passage P and the generated question Q, the reward R is defined as follows:

$$R_{coverage} = ESSK(YAKE(P), Q)$$

The policy gradient is given by:

$$\nabla_\emptyset J(\emptyset) = E[R \cdot \nabla_\emptyset \log(P(y^s | x, \emptyset))]$$

where, R can be any reward value, Ø represents the model parameters, x is the input paragraph and $y^s$ is the generated output. Hence, the overall loss term 201 generated by reward component 202 for training the question generator 116 becomes:

$$L_{total} = \lambda_{CE} \cdot L_{CE} + \lambda_{reward} \cdot L_{reward}$$

The persona-to-interest mapper 118 maps interests identified by the interest detection component 112 to the personas. The persona may be considered as a grouping of interests within a document that a single type of reader is likely to have. A purpose of personas is to reduce the possible number of interests from a user to choose from. The persona may also be described in terms that describe a reader, rather than interests. The interests generated for a document may be used as dimensions that define the document. Each persona may be interested in one or more of these dimensions. The mapping between multiple personas and multiple interests may be described as the persona space. The persona may be generated by a domain expert and then applied to documents that are in a domain.

A domain expert (financial domain; specifically for SEC 10-K filings) may be used to get an understanding of the personas who read types of documents and what kind of information they are generally interested in. The domain expert may generate a matrix listing out the various stakeholders of a particular document type, a general 10-K filing (as an example) against the different sections of the document each stakeholder is interested in. For example, an employee may be interested in sections 3, 7, and 9 according to the domain expert. In this case, the detected interests from sections 3, 7, and 9 may then be mapped to the employee persona. This process can be repeated for each persona. A persona space or matrix may be generated for many different types or domains of documents. Once generated, the persona space can be reused each time a navigation specific interface is generated for a document in the type. The domain may be automatically detected through a classifier or specified by a user.

Domain experts are not required. The technique described herein is generalizable to any domain. In the absence of domain specific knowledge, each interest may be a sufficiently distinct topic and can be treated as a proxy to personas. Hence, no special matrix is required and modelling of interests can be done directly.

The navigation interface 120 outputs a dynamic persona-based navigation interface that highlights the sections of interest to the persona selected by a reader. The persona-based navigation interface may take the form of a TOC.

Figure 3:
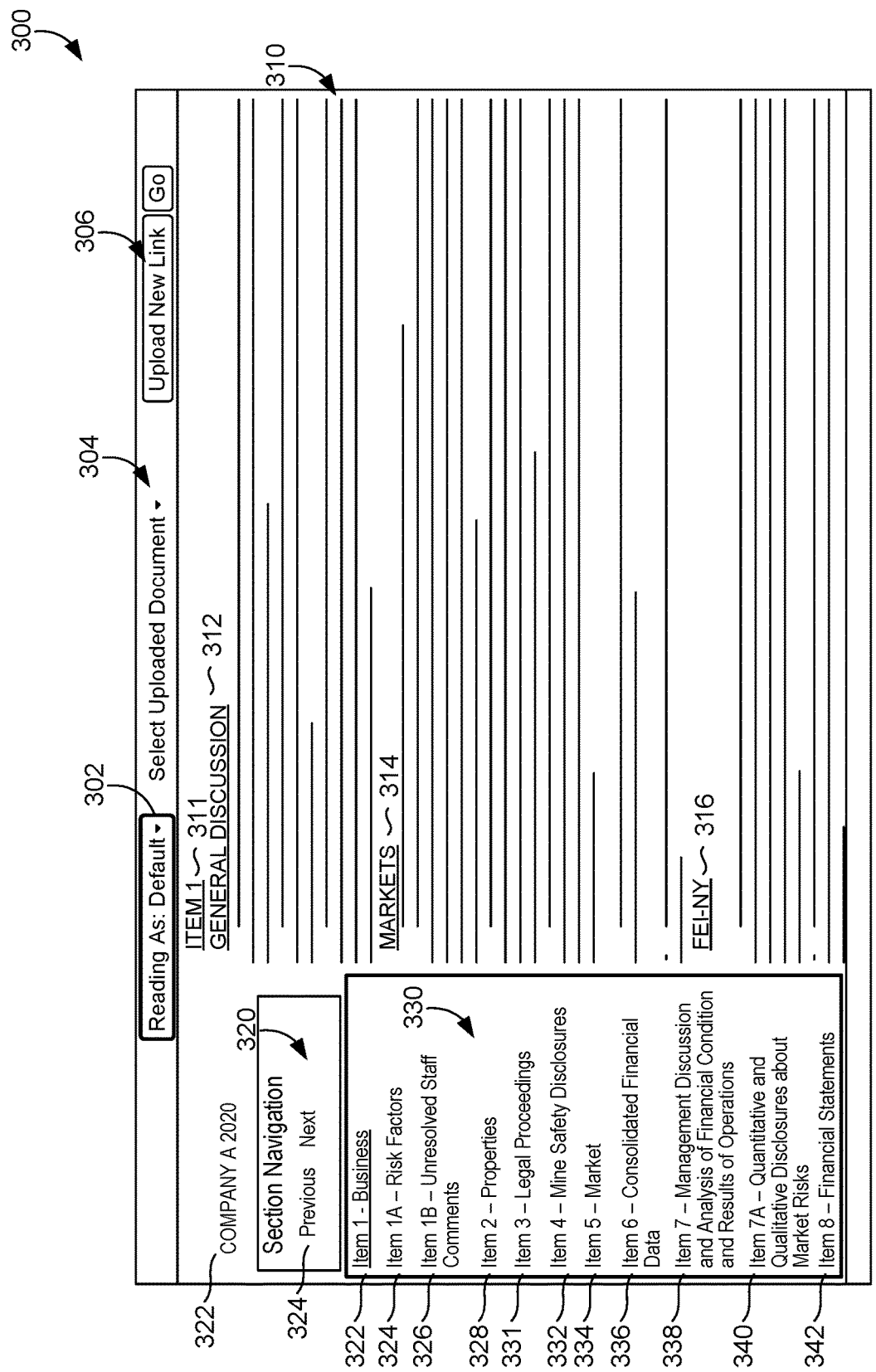
FIG. 3 is an illustration of a default navigation interface, in accordance with embodiments of the technology described herein.

Turning now to FIG. 3, an exemplary document interface 300 with a persona-specific navigation interface 330 is shown in default reading mode, according to aspects of the technology described herein. The interfaces described herein are set forth only as examples. Other arrangements and elements may be used in addition to or instead of those shown, and some elements may be omitted altogether for the sake of clarity.

The exemplary document interface 300 includes a document view interface 310, a table-of-contents navigation interface 320, and a persona specific navigation interface 330. The document view interface 310 displays document content, such as text, images, and tables. The document being shown may be selected through the document selection interface 304. A document that is not previously stored in the reading system may be uploaded into the viewing interface using the uploaded upload link 306.

The document content shown includes headings and text. Item 1 311 is the first heading, followed by subheading "general discussion" 312, subheading "markets" 314, and subheading "FEI-NY" 316. Each subheading is followed by text related to the subheading by subject matter. The content shown in the document view interface 310 may be directed navigated by one or more mechanisms, such as scrolling. Sequential scrolling shows all content in the document in in the order the content is arranged within the document. As an alternative to scrolling, a page down or page up navigation command may be used.

The title of the document, "Company A. 2020" 322, is shown followed by a section navigation interface 320. The section navigation interface 320 allows the user to navigate between previous and subsequent sections using the previous and next inputs 324. Navigating section-by-section is an alternative to scrolling or navigating page-by-page. In the default arrangement shown, the sections are displayed according to the arrangement within the document. Upon clicking the next input, the next sequential section would be displayed in the document view interface 310.

The persona specific navigation interface 330 is shown in default reader mode. The default reader mode is not related to any specific persona. A specifics persona may be chosen through the persona-selection interface 302. The default version of the persona-specific navigation interface 330 includes headings listed in order they are found within the document. The headings include "item 1—business" 322, "item 1A—the risk factors" 324, "item 1B—unresolved staff comments" 326, "item 2—properties" 328, "item 3—legal proceedings" 331, "item 4—mine safety disclosures" 332, "item 5—market" 334, "item 6—consolidated financial data" 336, "item 7—management discussion and analysis of financial condition and results of operations" 338, "item 78—qualitative and quantitative disclosures about market risks" 340, and "item 8—financial statements" 342. The persona-selection interface 302 may be scrollable with additional headings from the document displayed upon scrolling down. The headings shown in the persona-specific interface 330 may be selectable. Upon selecting a heading, the heading and associated content may displayed in the document viewing interface 310. In this way, the headings may help a reader navigate to portions of the document that are particular interest to the reader. The description of the headings shown may be taken verbatim from the document. The headings may be automatically extracted or electronically designated by an author or editor of the document.

Figure 4:
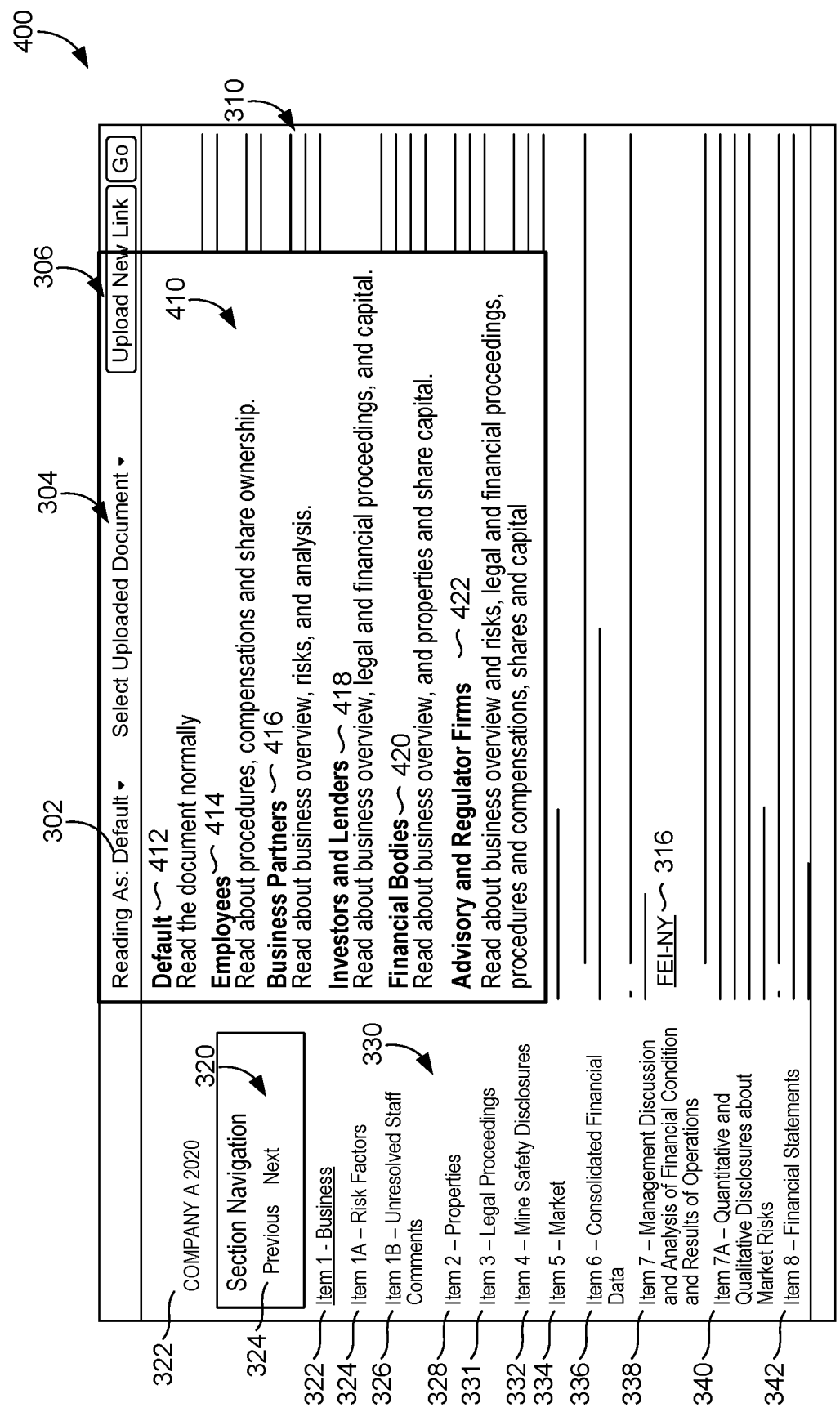
FIG. 4 is an illustration showing the selection of a persona in a document navigation interface, in accordance with embodiments of the technology described herein.

Turning now to FIG. 4, an exemplary document interface 400 with a persona-specific navigation interface 330 with a persona selection interface 302 is shown, according to aspects of the technology described herein. As mentioned, the persona-specific navigation interface 330 may be customized to particular persona selected through the persona selection interface 302. The user can activate the persona selection interface by clicking on the persona shown, which was initially default 412. Each persona may be shown with a label and description of the interests associated with the label. The personas shown include a default persona 412, and employees persona 414, business partners persona 416, and investors and lenders persona 418, of financial bodies persona 420, and advisory and regulator firms persona 422. These personas are just provided as examples and not meant to be limiting. Different types of documents may be associated with different personas.

Figure 5:
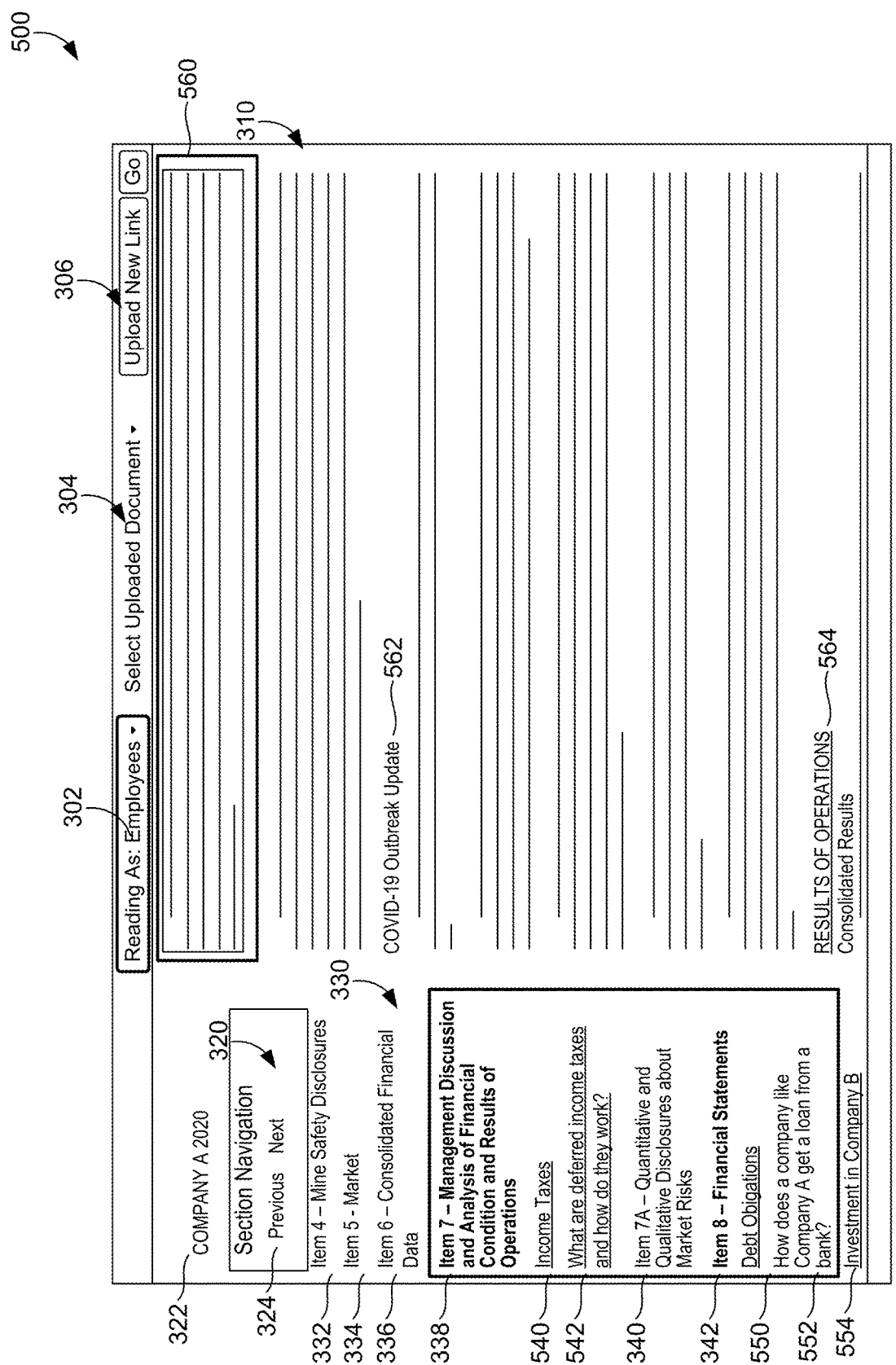
FIG. 5 is an illustration showing a persona specific navigation interface, in accordance with embodiments of the technology described herein.

Turning now to FIG. 5, an exemplary document interface 500 with a persona-specific navigation interface 330 is shown in a first persona-specific reading mode, according to aspects of the technology described herein. The persona-specific navigation interface 330 shown in FIG. 5 is customized to the employees' persona, as indicated by the "employees" label displayed in the persona-selection interface 302. The persona specific navigation interface 330 now highlights heading 338 and heading 342. In the default view, only the headings themselves were shown. In the employees specific persona view, the subheadings "income taxes" 540 and "debt obligations" 550 are shown. In addition, the persona specific navigation interface 330 includes custom generated questions that help the user understand what is being described in corresponding portions of the document. The first question 542 asks, "what are deferred income taxes and how do they work?" The second question 552 asks, "how does a company like company A get a loan from a bank?"

Selecting the first question 542 would cause content answering this question to be displayed in the viewing interface 310. In one aspect, the portions of document content that is most relevant to the question are shown first within the viewing interface 310. Ordering content by relevance rather than the native order of occurrence within that document helps the reader access the most relevant content quickly. The content displayed in the viewing interface 310 need not be sequential and could be taken from various portions of the document. For example, paragraph 560 might be from Item 8 342, while the following portions under the subheading 562 and subheading 564 are from an earlier portion of the document, such as under item 7 338. Selecting the second question 552 would cause content related to the second question to be shown in the document-viewing interface 310.

Figure 6:
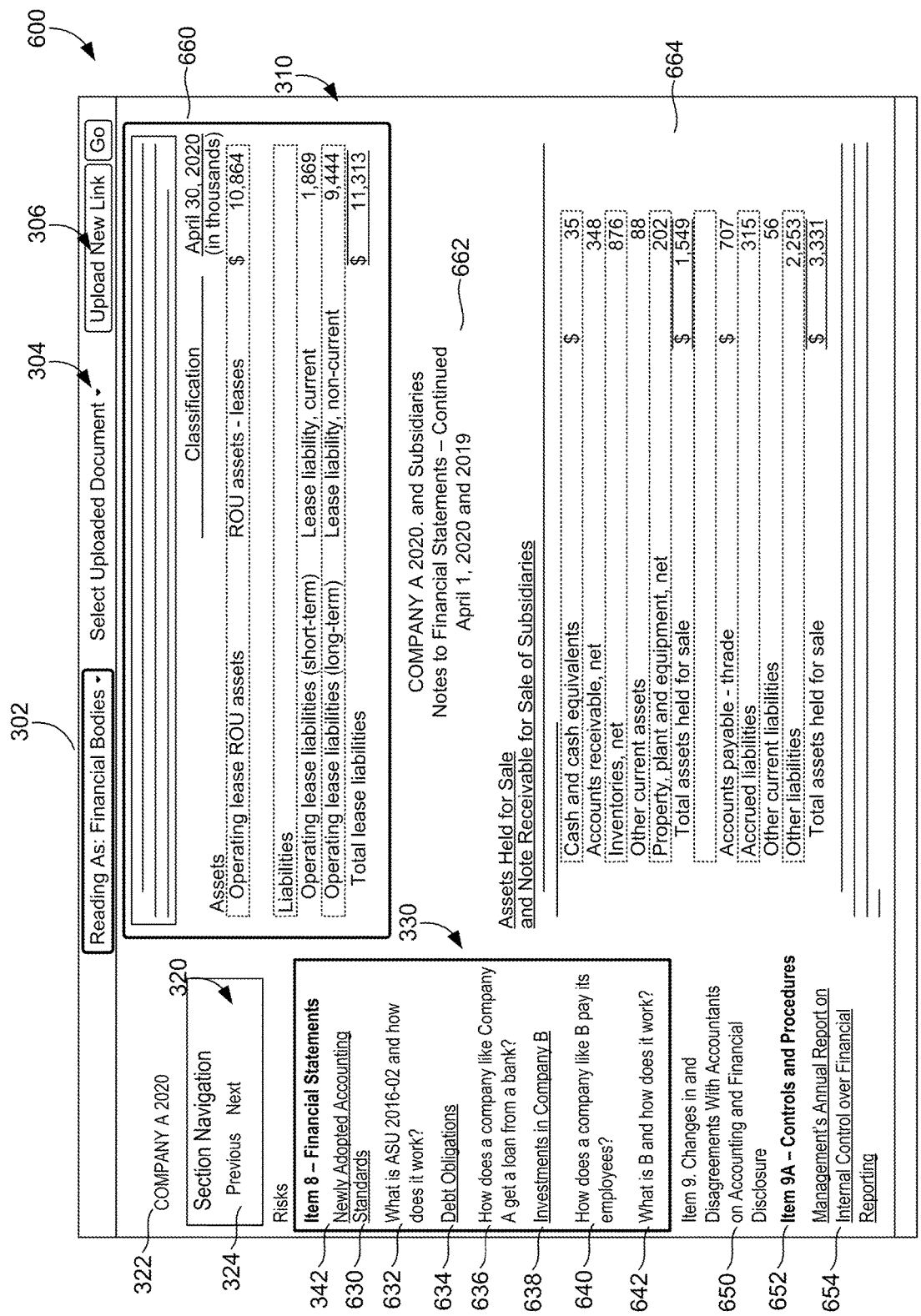
FIG. 6 is an illustration showing a persona specific navigation interface, in accordance with embodiments of the technology described herein.

Turning now to FIG. 6, an exemplary document interface 600 with a persona-specific navigation interface 330 is shown in a second persona-specific reading mode, according to aspects of the technology described herein. The persona specific reading mode selected in FIG. 6 is financial bodies.

As can be seen, the persona-specific navigation interface 330 for financial bodies emphasizes item 8 342. In contrast to the default view shown in FIG. 3 or the employee view of FIG. 5, additional subheadings and customized questions are shown. The subheadings shown include subheading "newly adopted accounting standards" 630, "debt obligations" 634, and "investments in company B" 638. These subheadings can correspond subheadings within the document. The persona-specific navigation interface 330 also includes heading "item 9" 650, heading "item 9A" 652, and subheading 654.

Four customized questions are shown. The first question asks, "what is ASU2016-02 and how does it work?" 632 The second question asks, "how does a company like company A get a loan from a bank?" 636 The second question was also shown in the employee view described previously in FIG. 5. This illustrates that customized questions can occur within multiple persona-specific views. The third question asks, "how does a company like B pay its employees?" 640 The fourth question asks, "what is B and how does it work?" 642 Clicking on any of these questions will cause document content that answers the questions to be displayed in the document viewing interface 310. The content may be shown in order of relevance to the question, rather than a native order in which the content is presented within the document.

The content shown in the document viewing interface 310 includes a first table 660, at headings 662 and a second table 664. As described previously, the tables may occur in appendix or other portion of the document that is not adjacent to text describing the tables. Aspects the technology described herein can associate a table with content in a document even when the content does not specifically reference or link to a table by title, page, or table number.

Exemplary Methods

Figure 7:
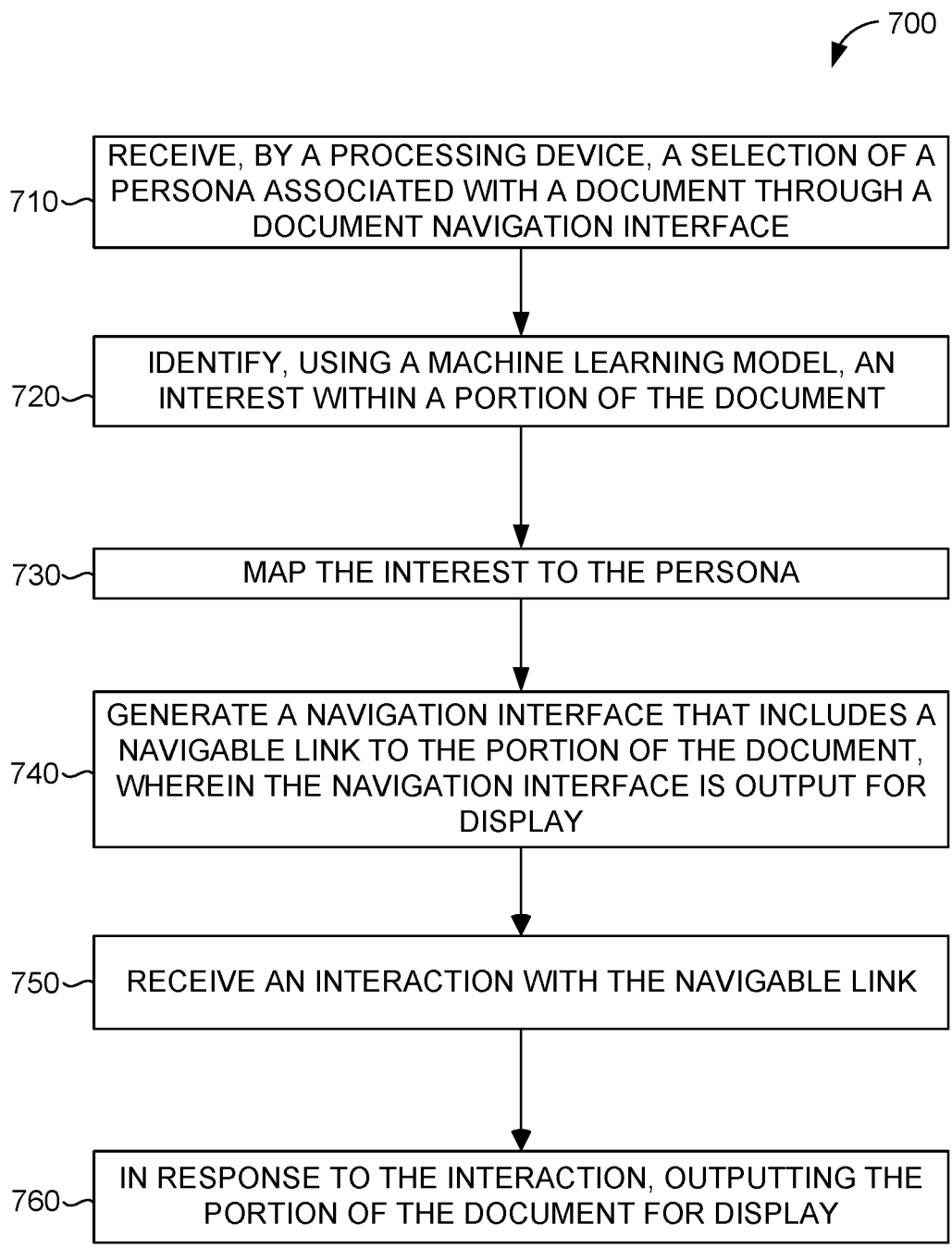
FIG. 7 provides an example method persona-based document navigation, in accordance with embodiments of the technology described herein.
Figure 8:
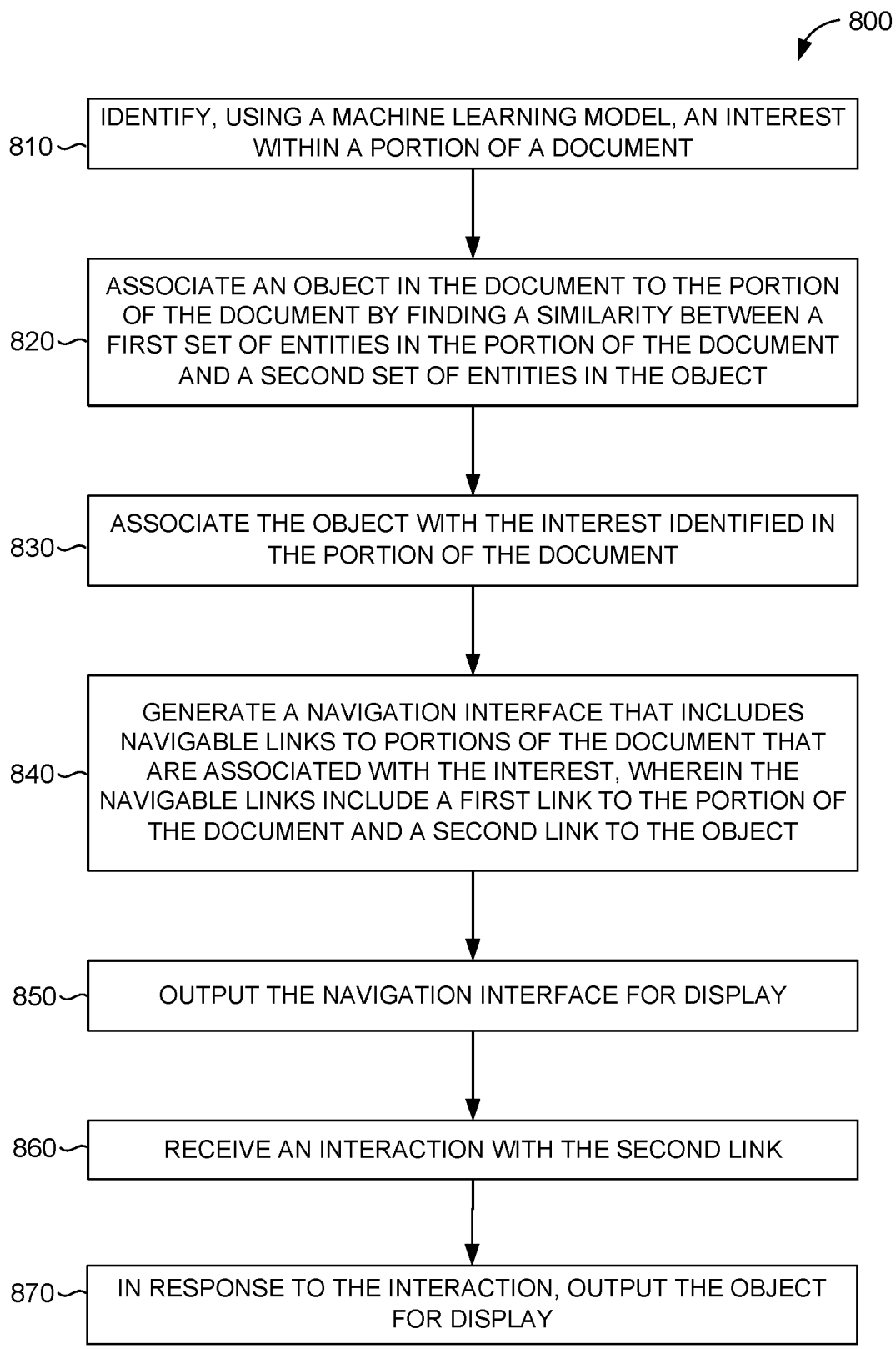
FIG. 8 provides an example method of persona-based document navigation, in accordance with embodiments of the technology described herein.
Figure 9:
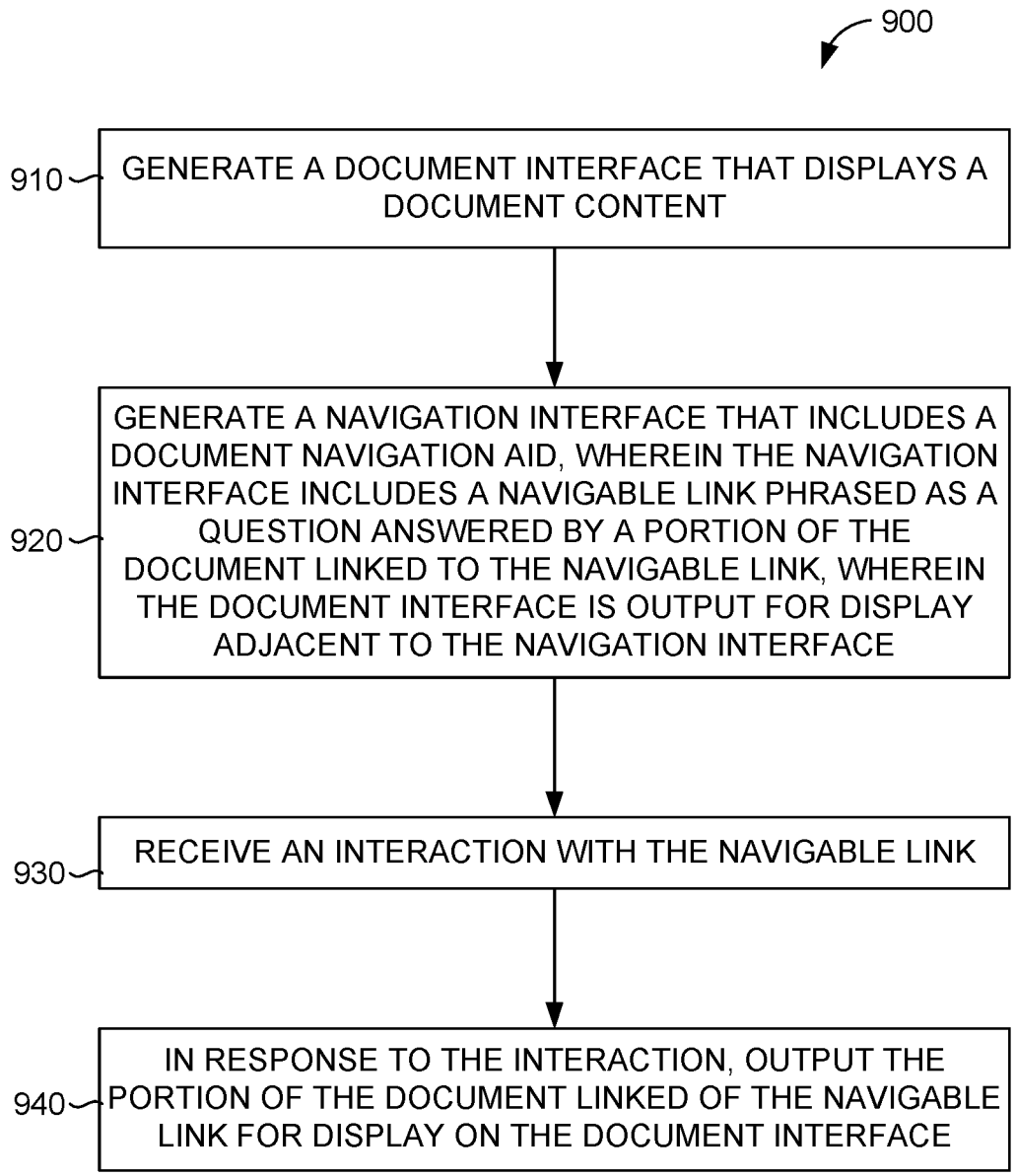
FIG. 9 provides an example method of persona-based document navigation, in accordance with embodiments of the technology described herein.

Now referring to FIGS. 7-9, each block of methods 700, 800, and 900, described herein, comprises a computing process that may be performed using any combination of hardware, firmware, and/or software. For instance, various functions may be carried out by a processor executing instructions stored in memory. The methods may also be embodied as computer-usable instructions stored on computer storage media. The method may be provided by a standalone application, a service or hosted service (standalone or in combination with another hosted service), to name a few. In addition, methods 700, 800, and 900 are described, by way of example, with respect to the persona-based navigation system 110 of FIG. 1 and additional features of FIGS. 2-6. However, these methods may additionally or alternatively be executed by any one system, or any combination of systems, including, but not limited to, those described herein.

FIG. 7 is a flow diagram showing a method 700 for generating a persona specific navigation interface, in accordance with some embodiments of the present disclosure. The method 700, at block 710, includes receiving, by a processing device, a selection of a persona associated with a document through a document navigation interface. A persona selection interface has been described previously with reference to FIGS. 3, 4, 5, and 6. The persona selection interface may display available personas from which the user may choose. The selection interface may be a drop down menu, pop up window, or the other selection interface. Each type of document may have different personas to select. The persona may be considered as a grouping of interests within a document that a single type of reader is likely to have. A purpose of personas is to reduce the possible number of interests from a user to choose from. The persona may also be described in terms that describe a reader, rather than interests. A single persona may be associated with multiple interests.

The method 700, at block 720, includes identifying, using a machine learning model, an interest within a portion of the document. As a preliminary step, the document may be segmented into portions for analysis. In one aspect, the portions are paragraphs. The text of each portion may be analyzed as a separate data point for interests expressed in the text.

In one aspect, the text is pre-processed into each of several formats. The text in several formats is then stored in a single JSON dictionary. In one aspect, the pre-processed formats include a tokenized version, a stemmed version, and a core words version. Types of applicable tokenization may include character (e.g., n-gram) tokenization, word tokenization, byte pair encoding (BPE), and sub-word tokenization. The word tokenization splits a piece of text into individual words based on a certain delimiter (e.g., space). Depending upon delimiters, different word-level tokens are formed. The stemmed version may be generated using a heuristic that reduces words in a text to their base. Stemming may involve removing the prefix or suffix of words so that only the base of the word remains. The core words version may include only the content words (e.g., meaningful words, like nouns, verbs, adjectives and adverbs) of the paragraph. The core words may be generated by identifying keywords, noun phrases, entities, and/or by excluding stop words.

Unsupervised interest detection may be used to automatically extract interpretable interests from the textual documents. In an aspect, a self-supervised contrastive learning model for interest detection is used. Self-supervised learning is a subset of unsupervised learning. Unlike supervised learning, it does not require any labelled training data. Instead, it creates self-defined pseudo labels as supervision and learns text representations, which are then used in downstream tasks. Contrastive learning aims to group similar samples closer and diverse samples far from each other.

The process of training self-supervised contrastive learning model may start by obtaining a vocabulary for the whole corpus of words in a document. The vocabulary may be sorted alphabetically and each word is given an index, so that corresponding IDF ("Inverse Dense Frequency")/word vectors can be referenced. In an aspect, 128-dimensional word vectors are generated on the corpus by a skip-gram model with an n-gram size of 5 characters. These are used to obtain a general embedding space for the words. The word vectors generated previously are clustered together based on similarity to obtain the desired number of clusters. In an aspect, K-means clustering is used to obtain 20 clusters comprising 10 keywords each. Each word representation is modified by multiplying it with the TF-IDF (Term Frequency(TF)—Inverse Dense Frequency(IDF) score so that the algorithm can adapt to the financial corpus better. The cluster of 10 keywords forms an interest. Thus, 20 interests may be detected in this example. The interests can be mapped back to paragraphs by calculating a similarity between the keywords in the cluster and keywords in the paragraph.

The method 700, at block 730, includes mapping the interest to the persona. The interests generated for a document may be used as dimensions that define the document. Each persona may be interested in one or more of these dimensions. The mapping between multiple personas and multiple interests may be described as the persona space.

The persona may be generated by a domain expert and then applied to documents that are in a domain.

A domain expert (financial domain; specifically for SEC 10-K filings) may be used to get an understanding of the personas who read types of documents and what kind of information they are generally interested in. The domain expert may generate a matrix listing out the various stakeholders of a particular document type, a general 10-K filing (as an example) against the different sections of the document each stakeholder is interested in. For example, an employee may be interested in sections 3, 7, and 9 according to the domain expert. In this case, the detected interests from sections 3, 7, and 9 may then be mapped to the employee persona. This process can be repeated for each persona. A persona space or matrix may be generated for many different types or domains of documents. Once generated, the persona space can be reused each time a navigation specific interface is generated for a document in the type. The domain may be automatically detected through a classifier or specified by a user.

Domain experts are not required. The technique described herein is generalizable to any domain. In the absence of domain specific knowledge, each interest may be a sufficiently distinct topic and can be treated as a proxy to personas. Hence, no special matrix is required and modelling of interests can be done directly.

The method 700, at block 740, includes generating a navigation interface that includes a navigable link to the portion of the document. The navigation interface is output for display. A navigation interface has been described previously with reference to FIGS. 3, 4, 5, and 6. The portion of the document is associated with the interest that is associated with the selected persona. Accordingly, the navigation interface includes persona specific content that is presented in response to the selection of the persona and determining the portion of the document is associated with one or more of the persona's interests. The navigation interface may be shown with a document interface that shows portions of a document. The navigation interface may include headings and questions that are selectable by the user. The headings and questions will describe the portion of the document.

The method 700, at block 750, includes receiving an interaction with the navigable link. The interaction may be a selection (e.g., moving a cursor to the link and clicking, contacting a touch screen where the link is displayed) a hover, a detected gaze, a gesture, a voice command, or some other interaction.

The method 700, at block 760, includes in response to the interaction, outputting the portion of the document for display. The portion of the document can be displayed in a document window that is adjacent to the navigation interface. The portion may be output by navigating the document to the portion.

FIG. 8 is a flow diagram showing a method 800 for generating a persona specific navigation interface, in accordance with some embodiments of the present disclosure. The method 800, at block 810, includes identifying, using a machine learning model, an interest within a portion of a document. As a preliminary step, the document may be segmented into portions for analysis. In one aspect, the portions are paragraphs. The text of each portion may be analyzed as a separate data point for interests expressed in the text.

In one aspect, the text is pre-processed into each of several formats. The text in several formats is then stored in a single JSON dictionary. In one aspect, the pre-processed formats include a tokenized version, a stemmed version, and a core words version. Types of applicable tokenization may include character (e.g., n-gram) tokenization, word tokenization, byte pair encoding (BPE), and sub-word tokenization. The word tokenization splits a piece of text into individual words based on a certain delimiter (e.g., space). Depending upon delimiters, different word-level tokens are formed. The stemmed version may be generated using a heuristic that reduces words in a text to their base. Stemming may involve removing the prefix or suffix of words so that only the base of the word remains. The core words version may include only the content words (e.g., meaningful words, like nouns, verbs, adjectives and adverbs) of the paragraph. The core words may be generated by identifying keywords, noun phrases, entities, and/or by excluding stop words.

Unsupervised interest detection may be used to automatically extract interpretable interests from the textual documents. In an aspect, a self-supervised contrastive learning model for interest detection is used. Self-supervised learning is a subset of unsupervised learning. Unlike supervised learning, it does not require any labelled training data. Instead, it creates self-defined pseudo labels as supervision and learns text representations, which are then used in downstream tasks. Contrastive learning aims to group similar samples closer and diverse samples far from each other.

The process of training self-supervised contrastive learning model may start by obtaining a vocabulary for the whole corpus of words in a document. The vocabulary may be sorted alphabetically and each word is given an index, so that corresponding IDF ("Inverse Dense Frequency")/word vectors can be referenced. In an aspect, 128-dimensional word vectors are generated on the corpus by a skip-gram model with an n-gram size of 5 characters. These are used to obtain a general embedding space for the words. The word vectors generated previously are clustered together based on similarity to obtain the desired number of clusters. In an aspect, K-means clustering is used to obtain 20 clusters comprising 10 keywords each. Each word representation is modified by multiplying it with the TF-IDF (Term Frequency(TF)—Inverse Dense Frequency(IDF) score so that the algorithm can adapt to the financial corpus better. The cluster of 10 keywords forms an interest. Thus, 20 interests may be detected in this example. The interests can be mapped back to paragraphs by calculating a similarity between the keywords in the cluster and keywords in the paragraph.

The method 800, at block 820, includes associating an object in the document to the portion of the document by finding a similarity between a first set of entities in the portion of the document and a second set of entities in the object. In one aspect, the object is a table. The table may not be referenced in the portion of the document or otherwise explicitly connected to the portion of the document. An algorithm may be used to extract keywords and entities from the tables and map the tables to paragraphs with similar keywords and entities. The interest(s) identified in the paragraph may then be assigned to the table. The table can then be linked to a persona via the interest.

As an initial step, tables are extracted from the document. Tables that contain the same or similar entities as a paragraph may be associated with the paragraph. Named Entity Recognition (NER) and Key Phrase Extraction (KPE) are used to identify entities within a table. Once entities and key phrases are extracted, they may be used to link tables to paragraphs. Initially, the contents of each paragraph and table may be stored separately. NER and KPE may be applied to each table and passage individually. In one aspect, a limit on the amount of key phrases and or entities extracted may be used. For example, the number of key phrases extracted for paragraphs may be limited to 20 and limited to 10 for tables (as tables generally have less text). Next, repeated named entities within a table or paragraph are removed. Then, the entities and the key phrases extracted for an element (e.g., paragraph or table) are added together to form a single string. Thus, a separate string may be created for each table and each paragraph.

A similarity metric is used to compare the strings (containing both NER and KPE) obtained for each paragraph string to each table string. While there are many similarity metrics available, in an aspect, Jaccard similarity may be used to generate the similarity score. Once the Jaccard similarity scores are obtained for each paragraph-table pair, given a paragraph, a table that has the maximum similarity score is matched to the paragraph (linking a relevant table, given a paragraph). In aspects, multiple tables can be linked to a single paragraph. In an aspect, all tables with a similarity score above a certain threshold are linked to the corresponding paragraph. In this way, it may be possible for multiple tables to be linked to a single paragraph and a table to be linked to multiple paragraphs.

The method 800, at block 830, includes associating the object with the interest identified in the portion of the document. A table may then be associated with one or more interests identified in a linked paragraph. These interests may be associated the table in a data store. In other aspects, the link is just between the table and paragraph and interests are not expressly associated with a table. When a paragraph is deemed relevant to an interest, then one or more tables linked to the paragraph may be displayed in the document view when the paragraph is displayed.

The method 800, at block 840, includes generating a navigation interface that includes navigable links to portions of the document that are associated with the interest. The navigable links include a first link to the portion of the document and a second link to the object. The method 800, at block 850, includes outputting the navigation interface for display. The navigation interface may include multiple headings, questions, or other content that describes portions of the document associated with a selected persona. Example navigation interfaces have been described in FIGS. 3,4, 5, and 6

The method 800, at block 860, includes receiving an interaction with the second link. The interaction may be a selection (e.g., moving a cursor to the link and clicking, contacting a touch screen where the link is displayed) a hover, a detected gaze, a gesture, a voice command, or some other interaction.

The method 800, at block 870, includes, in response to the interaction, output the object for display. The object (e.g., table, chart) may be output in an interface displayed adjacent to the navigation interface. The object may be output by navigating the document to the portion.

FIG. 9 is a flow diagram showing a method 900 for generating a persona-based navigation interface, in accordance with some embodiments of the present disclosure. The method 900, at block 910, includes generating a document interface that displays a document content.

The method 900, at block 920, includes generating a navigation interface that includes a document navigation aid, wherein the navigation interface includes a navigable link phrased as a question answered by a portion of the document linked to the navigable link. The document interface may be output for display adjacent to the navigation interface. A document interface and navigation interface have been described in FIGS. 3-6. The question may be generated by a method similar to that used by the question generator 116, which has been described previously.

The method 900, at block 930, includes receiving an interaction with the navigable link. The interaction may be a selection (e.g., moving a cursor to the link and clicking, contacting a touch screen where the link is displayed) a hover, a detected gaze, a gesture, a voice command, or some other interaction.

The method 900, at block 940, includes, in response to the interaction, outputting the portion of the document linked of the navigable link for display on the document interface. The portion may be output in an interface displayed adjacent to the navigation interface. The portion may be output by navigating the document to the portion.

Exemplary Operating Environment

Figure 10:
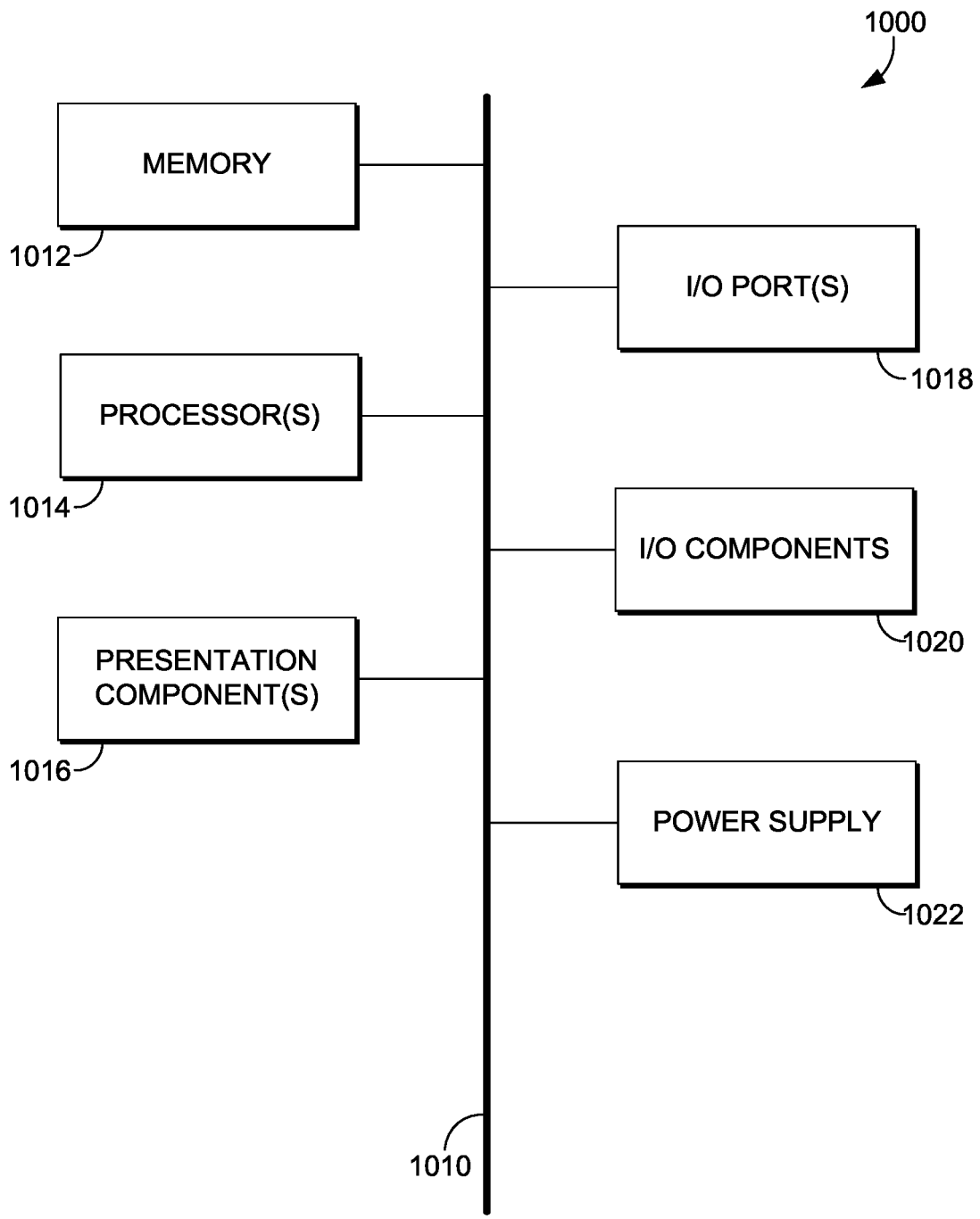
FIG. 10 is a block diagram of an example computing environment suitable for use in implementing embodiments of the technology described herein.

Having briefly described an overview of embodiments of the present invention, an example operating environment in which embodiments of the present invention may be implemented is described below in order to provide a general context for various embodiments of the present invention. Referring initially to FIG. 10 in particular, an example operating environment for implementing embodiments of the present invention is shown and designated generally as computing device 1000. Computing device 1000 is but one example of a suitable computing environment and is not intended to suggest any limitation as to the scope of use or functionality of the invention. Neither should computing device 1000 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 10, computing device 1000 includes bus 1010 that directly or indirectly couples the following devices: memory 1012, one or more processors 1014, one or more presentation components 1016, input/output ports 1018, input/output components 1020, and illustrative power supply 1022. Bus 1010 represents what may be one or more buses (such as an address bus, data bus, or combination thereof). The various blocks of FIG. 10 are shown with lines for the sake of conceptual clarity, and other arrangements of the described components and/or component functionality are contemplated. For example, one may consider a presentation component such as a display device to be an I/O component. In addition, processors have memory. Such is the nature of the art, and reiterate that the diagram of FIG. 10 is merely illustrative of an example computing device that can be used in connection with one or more embodiments of the present invention. Distinction is not made between such categories as "workstation," "server," "laptop," "hand-held device," etc., as all are contemplated within the scope of FIG. 10 and reference to "computing device."

Computing device 1000 typically includes a variety of computer-readable media. Computer-readable media can be any available media that can be accessed by computing device 1000 and includes both volatile and nonvolatile media, removable and non-removable media. By way of example, and not limitation, computer-readable media may include computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1000. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1012 includes computer storage media in the form of volatile and/or nonvolatile memory. The memory may be removable, non-removable, or a combination thereof. Exemplary hardware devices include solid-state memory, hard drives, optical-disc drives, etc. Computing device 1000 includes one or more processors that read data from various entities such as memory 1012 or I/O components 1020. Presentation component(s) 1016 present data indications to a user or other device. Exemplary presentation components include a display device, speaker, printing component, vibrating component, etc.

I/O ports 1018 allow computing device 1000 to be logically coupled to other devices including I/O components 1020, some of which may be built in. Illustrative components include a microphone, joystick, game pad, satellite dish, scanner, printer, wireless device, etc.

With reference to the technical solution environment described herein, embodiments described herein support the technical solution described herein. The components of the technical solution environment can be integrated components that include a hardware architecture and a software framework that support constraint computing and/or constraint querying functionality within a technical solution system. The hardware architecture refers to physical components and interrelationships thereof, and the software framework refers to software providing functionality that can be implemented with hardware embodied on a device.

The end-to-end software-based system can operate within the system components to operate computer hardware to provide system functionality. At a low level, hardware processors execute instructions selected from a machine language (also referred to as machine code or native) instruction set for a given processor. The processor recognizes the native instructions and performs corresponding low-level functions relating, for example, to logic, control and memory operations. Low-level software written in machine code can provide more complex functionality to higher levels of software. As used herein, computer-executable instructions includes any software, including low level software written in machine code, higher level software such as application software and any combination thereof. In this regard, the system components can manage resources and provide services for system functionality. Any other variations and combinations thereof are contemplated with embodiments of the present invention.

By way of example, the technical solution system can include an API library that includes specifications for routines, data structures, object classes, and variables may support the interaction between the hardware architecture of the device and the software framework of the technical solution system. These APIs include configuration specifications for the technical solution system such that the different components therein can communicate with each other in the technical solution system, as described herein.

The technical solution system can further include a machine-learning system. A machine-learning system may include machine-learning tools and training components. Machine-learning systems can include machine-learning tools that are utilized to perform operations in different types of technology fields. Machine-learning systems can include pre-trained machine-learning tools that can further be trained for a particular task or technological field. At a high level, machine learning is a field of study that gives computers the ability to learn without being explicitly programmed. Machine learning explores the study and construction of machine-learning tools, including machine-learning algorithm or models, which may learn from existing data and make predictions about new data. Such machine-learning tools operate by building a model from example training data in order to make data-driven predictions or decisions expressed as outputs or assessments. Although example embodiments are presented with respect to a few machine-learning tools, the principles presented herein may be applied to other machine-learning tools. It is contemplated that different machine-learning tools may be used, for example, Logistic Regression (LR), Naive-Bayes, Random Forest (RF), neural networks (NN), matrix factorization, and Support Vector Machines (SVM) tools may be used for addressing problems in different technological fields.

In general, there are two types of problems in machine-learning: classification problems and regression problems. Classification problems, also referred to as categorization problems, aim at classifying items into one of several category values (for example, is this email SPAM or not SPAM). Regression algorithms aim at quantifying some items (for example, by providing a value that is a real number). Machine-learning algorithms can provide a score (e.g., a number from 1 to 100) to qualify one or more products as a match for a user of the online marketplace. It is contemplated that cluster analysis or clustering can be performed as part of classification, where clustering refers to the task of grouping a set of objects in such a way that objects in the same group (called a cluster) are more similar (in some sense) to each other than to those in other groups (clusters). It is a main task of exploratory data mining, and a common technique for statistical data analysis, used in many fields, including pattern recognition, image analysis, information retrieval, bioinformatics, data compression, computer graphics and machine learning.

Machine-learning algorithms utilize the training data to find correlations among identified features (or combinations of features) that affect an outcome. A trained machine-learning model may be implemented to perform a machine-learning operation based on a combination of features. An administrator of a machine-learning system may also determine which of the various combinations of features are relevant (e.g., lead to desired results), and which ones are not. The combinations of features determined to be (e.g., classified as) successful are input into a machine-learning algorithm for the machine-learning algorithm to learn which combinations of features (also referred to as "patterns") are "relevant" and which patterns are "irrelevant." The machine-learning algorithms utilize features for analyzing the data to generate an output or an assessment. A feature can be an individual measurable property of a phenomenon being observed. The concept of feature is related to that of an explanatory variable used in statistical techniques such as linear regression. Choosing informative, discriminating, and independent features is important for effective operation of the machine-learning system in pattern recognition, classification, and regression. Features may be of different types, such as numeric, strings, and graphs.

The machine-learning algorithms utilize the training data to find correlations among the identified features that affect the outcome or assessment. The training data includes known data for one or more identified features and one or more outcomes. With the training data and the identified features the machine-learning tool is trained. The machine-learning tool determines the relevance of the features as they correlate to the training data. The result of the training is the trained machine-learning model. When the machine-learning model is used to perform an assessment, new data is provided as an input to the trained machine-learning model, and the machine-learning model generates the assessment as output.

Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions) can be used in addition to or instead of those shown.

Embodiments described in the paragraphs below may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further, the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present invention are described with reference to a distributed computing environment; however, the distributed computing environment depicted herein is merely exemplary. Components can be configured for performing novel embodiments of embodiments, where the term "configured for" can refer to "programmed to" perform particular tasks or implement particular abstract data types using code. Further, while embodiments of the present invention may generally refer to the technical solution environment and the schematics described herein, it is understood that the techniques described may be extended to other implementation contexts.

Embodiments of the present invention have been described in relation to particular embodiments that are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

What is claimed is:

1. A method comprising:
receiving, by a processing device, a selection of a persona associated with a document through a document navigation interface;
identifying, using a machine learning model, an interest within a portion of the document;
mapping the interest to the persona;
generating a navigation interface that includes a navigable link to the portion of the document, wherein the navigation interface is output for display, wherein the navigable link is phrased as a question that is automatically generated by a natural language processing model having an encoder-decoder architecture, wherein the natural language processing model is trained using a correctness reward that is positive when a generated question contains an entity found in the linked portion of the document;
receiving an interaction with the navigable link; and
in response to the interaction, outputting the portion of the document for display.

2. The method of claim 1, wherein the natural language processing model is trained using an answerability award calculated based on whether a generated question is answered in the linked portion of the document, wherein the answerability award is calculated using a classifier.

3. The method of claim 1, wherein the natural language processing model is trained using a coverage reward calculated that is positive when a generated question contains a first set of keywords similar to a second set of keywords found in the linked portion of the document.

4. The method of claim 1, wherein the document navigation interface includes multiple navigable links to different portions of the document and the navigable links are arranged in an order that is different from a native order of occurrence in the document.

5. The method of claim 1, wherein the method further comprises identifying the interest in the portion of the document using a self-supervised contrastive learning framework that adjusts a keyword representation using a TF-IDF ("Term Frequency-Inverse Document Frequency") score for a keyword associated with the keyword representation.

6. The method of claim 1, wherein the mapping of the interest to the persona is completed using a persona-interest matrix generated by a domain expert for a document type.

7. The method of claim 1, wherein the method includes:
associating a table in the document to the portion of the document by finding a similarity between entities in the portion of the document and entities in the table; and
associating the table with the interest identified in the portion of the document.

8. The method of claim 1, wherein the navigation interface includes multiple navigable links to different portions of the document and the navigable links are arranged in an order that is different from a native order of occurrence in the document.

9. A non-transitory computer-readable medium storing computer-executable instructions that, when executed by a processing device, cause the processing device to perform operations comprising:
identifying, using a machine learning model, an interest within a portion of a document;
associating an object in the document to the portion of the document by finding a similarity between a first set of entities in the portion of the document and a second set of entities in the object;
associating the object with the interest identified in the portion of the document;
generating a navigation interface that includes navigable links to portions of the document that are associated with the interest, wherein the navigable links include a first link to the portion of the document and a second link to the object, wherein the navigable link is phrased as a question that is automatically generated by a natural language processing model having an encoder-decoder architecture, wherein the natural language processing model is trained using a coverage reward calculated that is positive when a generated question contains a first set of keywords similar to a second set of keywords found in the linked portion of the document;

outputting the navigation interface for display:
receiving an interaction with the second link; and
in response to the interaction, outputting the object for display.

10. The non-transitory computer-readable medium of claim 9, wherein the method further comprises applying named entity recognition and key phrase extraction to portions of the document and the object.

11. The non-transitory computer-readable medium of claim 10, wherein the method further comprises:
adding each unique entity and unique key phrase extracted from the object into a first single string for the object; and
adding each unique entity and unique key phrase extracted for a portion into to form a second single string for the portion;
generating a similarity score for the first single string and the second single string.

12. The non-transitory computer-readable medium of claim 11, wherein the method further comprises associating the object with the portion because the similarity score is above a threshold similarity.

13. The non-transitory computer-readable medium of claim 9, wherein the method further comprises identifying the interest in the portion of the document using a self-supervised contrastive learning framework that adjusts a keyword representation using a TF-IDF ("Term Frequency-Inverse Document Frequency") score for a keyword associated with the keyword representation.

14. The non-transitory computer-readable medium of claim 9, wherein the object is a table.

15. A system comprising:
a memory component; and
a processing device coupled to the memory component, the processing device to perform operations comprising:
generating a document interface that displays a document content;
generating a navigation interface that includes a document navigation aid, wherein the navigation interface includes a navigable link phrased as a question answered by a portion of the document linked to the navigable link, wherein the document interface is output for display adjacent to the navigation interface, wherein the question is automatically generated by a natural language processing model having an encoder-decoder architecture, wherein the natural language processing model is trained using an answerability award calculated based on whether a generated question is answered in the linked portion of the document, wherein the answerability award is calculated using a classifier;
receiving an interaction with the navigable link; and
in response to the interaction, outputting the portion of the document linked of the navigable link for display on the document interface.

16. The system of claim 15, wherein the method further comprises
receiving a selection of a persona associated with the document content through a document interface;
identifying, using a machine learning model, an interest within the portion of the document;
mapping the interest to the persona.

17. The system of claim 16, wherein the method further comprises identifying the interest in the portion of the document using a self-supervised contrastive learning framework that adjusts a keyword representation using a TF-IDF ("Term Frequency-Inverse Document Frequency") score for a keyword associated with the keyword representation.

18. The system of claim 16, wherein the mapping of the interest to the persona is completed using a persona-interest matrix generated by a domain expert for a document type.

19. The system of claim 17, wherein the natural language processing model is trained using a correctness reward that is positive when a generated question contains an entity found in the linked portion of the document.

20. The system of claim 17, wherein the natural language processing model is trained using a coverage reward calculated that is positive when a generated question contains a first set of keywords similar to a second set of keywords found in the linked portion of the document.

* * * * *